US011483872B2

(12) United States Patent
Lei et al.

(10) Patent No.: US 11,483,872 B2
(45) Date of Patent: Oct. 25, 2022

(54) PUCCH RESOURCE CONFIGURATION IN TWO-STEP RACH

(71) Applicant: QUALCOMM INCORPORATED, San Diego, CA (US)

(72) Inventors: Jing Lei, San Diego, CA (US); Yi Huang, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 16/947,662

(22) Filed: Aug. 11, 2020

(65) Prior Publication Data

US 2021/0051727 A1    Feb. 18, 2021

Related U.S. Application Data

(60) Provisional application No. 62/888,325, filed on Aug. 16, 2019.

(51) Int. Cl.
*H04W 74/08* (2009.01)
*H04W 72/04* (2009.01)
(Continued)

(52) U.S. Cl.
CPC ....... *H04W 74/0833* (2013.01); *H04L 1/1812* (2013.01); *H04W 72/0406* (2013.01); *H04L 12/189* (2013.01)

(58) Field of Classification Search
CPC ... H04W 28/04; H04W 72/04; H04W 72/042; H04W 88/08; H04W 72/0406;
(Continued)

(56) References Cited

U.S. PATENT DOCUMENTS 10,893,547 B2 *  1/2021  Lei ................. H04L 5/0053
2020/0267774 A1 *  8/2020  Vos ................. H04L 5/0048
(Continued)

FOREIGN PATENT DOCUMENTS

WO         2018203735 A1    11/2018
WO    WO 2018/203735 A1 *  11/2018  ............ H04W 72/04

OTHER PUBLICATIONS

3GPP TSG RAN WG1 #97, Reno, USA, May 13-17, 2019, R1-1907726, Agenda item: 7.2.1.2, Source: Nokia, Nokia Shanghai Bell, Title: 2-step RACH procedure Feature Lead Summary. (Year: 2019).*

(Continued)

*Primary Examiner* — Peter G Solinsky
*Assistant Examiner* — Sanjay K Dewan
(74) *Attorney, Agent, or Firm* — Haynes and Boone, LLP

(57) ABSTRACT

Wireless communication devices, systems, and methods related to mechanisms to implement PUCCH resource configuration for two-step RACH for subsequent HARQ messaging. After a UE transmits msgA to a BS, the BS responds with msgB including a PUCCH resource indicator in a DCI of PDCCH, or a PUCCH resource indicator in PDSCH. The UE attempts to decode PDCCH or PDSCH, respectively. Upon decoding, the UE will use the configuration identified by the resource indicator. With the PUCCH resource configuration information, the UE signals a HARQ message.

40 Claims, 12 Drawing Sheets

(51) Int. Cl.
    *H04L 1/18*      (2006.01)
    *H04L 12/18*     (2006.01)

(58) Field of Classification Search
    CPC ............ H04W 74/0833; H04L 5/0007; H04L 5/0055; H04L 1/1812
    USPC ........................................................ 370/329
    See application file for complete search history.

(56) References Cited

U.S. PATENT DOCUMENTS

2020/0314915 A1* 10/2020 Lin .................... H04W 74/0833
2021/0274535 A1*  9/2021 Yi ......................... H04W 76/11

OTHER PUBLICATIONS

3GPP TSG RAN WG1 Meeting #97, Reno, USA, May 13-May 17, 2019, R1-1906051, Agenda Item: 7.2.1.2, Source: Huawei, HiSilicon, Title: Discussion on 2-step RACH procedure. (Year: 2019).*

3GPP TSG-RAN WG2 Meeting #104, Spokane, USA, Nov. 12-16, 2018, R2-1817064, Source: ZTE Corporation, Sanechips, Title: Msg2 payload contents for 2-step RACH, Agenda item: 11.2.1.1. (Year: 2018).*

TSG-RAN WG1 #92, Athens, Greece, Feb. 26-Mar. 2, 2018, R1-1803393, Source: Ericsson, Title: Outcome of Offline Session on RACH and DCI, Agenda item: 7.1.3.1.4. (Year: 2018).*

Ericsson: "Outcome of Offline Session on RACH and DCI", 3GPP Draft, R1-1803393, 3GPP TSG-RAN WG1 #92, Outcome of Offline Session on RACH and DCI, 3rd Generation Partnership Project (3GPP), Mobile Competence Centre, 650, Route Des Lucioles, F-06921 Sophia-Antipolis Cedex, Fran, vol. RAN WG1, No. Athens, Greece, Feb. 26, 2018-Mar. 2, 2018, Mar. 1, 2018 (Mar. 1, 2018), XP051398621 3 Pages, Retrieved from the Internet: URL:http://www.3gpp.org/ftp/tsg%5Fran/WG1%5FRL1/TSGR1%5F92/Docs/ [retrieved on Mar. 1, 2018] the Whole Document.

Huawei, et al., "Discussion on 2-step RACH Procedure", 3GPP Draft, R1-1906051, 3GPP TSG RAN WG1 Meeting #97, 3rd Generation Partnership Project (3GPP), Mobile Competence Centre, 650, Route Des Lucioles, F-06921 Sophia-Antipolis Cedex, France vol. Ran WG1, No. Reno, USA, May 13, 2019-May 17, 2019, May 13, 2019 (May 13, 2019), X051727508, 12 pages, Retrieved from the Internet: URL:http://www.3gpp.org/ftp/Meetings%5F3GPP%5FSYNC/RAN1/Docs/R1%2D1906051%2Ezip [retrieved on May 13, 2019] Chapter 3.4, sections 2-4.

International Search Report and Written Opinion—PCT/US2020/045855—ISA/EPO—dated Nov. 10, 2020.

Motorola Mobility, et al., "2-Step RACH Procedure", 3GPP Draft, R1-1907238, 3GPP TSG-RAN WG1 #97, 2-Step RACH Procedure, 3rd Generation Partnership Project (3GPP), Mobile Competence Centre, 650, Route Des Lucioles, F-06921 Sophia-Antipolis Cedex, France vol. RAN WG1, No. Reno, USA, May 13, 2019-May 17, 2019, May 13, 2019 (May 13, 2019), XP051728681, 3 Pages, Retrieved from the Internet: URL:http://www.3gpp.org/ftp/Meetings%5F3GPP%5FSYNC/RAN1/Docs/R1%2D1907238%2Ezip [retrieved on May 13, 2019] the Whole Document.

Nokia, et al., "2-Step RACH Procedure Feature Lead Summary", 3GPP Draft,. R1-1907726, 3GPP TSG RAN WG1 #97, 2-Step RACH Procedure Feature Lead Summary RAN1#97, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019, May 16, 2019 (May 16, 2019), XP051740005 Retrieved from the Internet: URL:http://www.3gpp.org/ftp/tsg%5Fran/WG1%5FRL1/TSGR1%5F97/Docs/R1%2D1907726%2Ezip [retrieved on May 16, 2019] Chapter 3.3.

Vivo: "Fallback Procedure from 2-Step RACH to 4-Step RACH", 3GPP Draft, R2-1905651, 3GPP TSG-RAN WG2 Meeting #106, Fallback Procedure from 2-Step RACH 4-Step RACH, 3rd Generation Partnership Project (3GPP), Mobile Competence Centre, 650, Route Des Lucioles, F-06921 Sophia-Antipolis Cedex, vol. RAN WG2, No. Reno, USA, May 13, 2019-May 17, 2019, May 13, 2019 (May 13, 2019), XP051729154 4 Pages, Retrieved from the Internet: URL:http://www.3gpp.org/ftp/Meetings%5F3GPP%5FSYNC/RAN2/Docs/R2%2D1905651%2Ezip [retrieved on May 13, 2019] the Whole Document.

Vivo: "RAN2 Impacts of 2-Step RACH", 3GPP Draft, R2-1818260, 3GPP TSG-RAN WG2 Meeting #104, RAN2 Impacts of 2-Step RACH, 3rd Generation Partnership Project (3GPP), Mobile Competence Centre, 650, Route Des Lucioles, F-06921 Sophia-Antipolis Cedex, France vol. RAN WG2, No. Spokane, USA, Nov. 12, 2018-Nov. 16, 2018, Nov. 12, 2018 (Nov. 2, 2018), XP051557761, 5 Pages, Retrieved from the Internet: URL:http://www.3gpp.org/ftp/Meetings%5F3GPP%5FSYNC/RAN2/Docs/R2%2D1818260%2Ezip [retrieved on Nov. 12, 2018] the Whole Document.

ZTE Corporation, et al., "Msg2 Payload Contents for 2-step RACH", 3GPP Draft, 3GPP TSG-RAN WG1 Meeting #104, R2-1817064_R2, 3rd Generation Partnership Project (3GPP), Mobile Competence Centre, 650, Route Des Lucioles, F-06921 Sophia-Antipolis Cedex, France Nov. 16, 2018 (Nov. 16, 2018), 9 Pages, XP051480988, Retrieved from the Internet: URL:http://www.3gpp.org/ftp/tsg%5Fran/WG2%5FRL2/TSGR2%5F104/Docs/R2%2D1817064%2Ezip p. 7-p. 8.

Nokia, et al., "On 2-Step RACH Procedure", 3GPP Draft, 3GPP TSG RAN WG1 #97, R1-1906747, on 2-Step RACH Procedure, 3rd Generation Partnership Project (3GPP), Sophia-Antipolis Cedex, France, vol. RAN WG1, No. Reno, USA, May 13, 2019-May 17, 2019,May 13, 2019 (May 13, 2019), XP051728198, 23 Pages, Internet: URL: http://www.3gpp.org/ftp/Meetings%5F3GPP%5FSYNC/RAN1/Docs/R1%2D1906747%2Ezip, Sect. 1-2, Sect. 2.1,2. 4, Sect. 2.3-2.8, Sect. 2.5, 2.6.3, 2.7, 2.7.1, Figures 6, 7,1-8, tables 1-3, Sect.1-3.

* cited by examiner

| Index | PUCCH format | First symbol | Number of symbols | PRB offset $RB_{\text{offset}}^{PUCCH}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

FIG. 5A

| Index | PUCCH format | First symbol | Number of symbols | PRB offset $RB_{\text{offset}}^{PUCCH}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 3, 6, 9} |

| DCI Format 1_0 with CRC Masked by msgB_RNTI | |
|---|---|
| Field | Bit Width |
| Identifier of DCI formats | 1 |
| Frequency Domain Resource Assignment | Variable |
| Time Domain Resource Assignment | 4 |
| VRB-to-PRB Mapping | 1 |
| MCS | 5 |
| NDI | 1 |
| RV | 2 |
| HARQ Process Number | 4 |
| DAI | 2 |
| TPC for PUCCH | 2 |
| PUCCH Resource Indicator | 3 |
| PUSCH to HARQ FB Timing Indicator | 3 |

| DCI Format 1_0 with CRC Masked by msgB_RNTI | |
|---|---|
| Field | Bit Width |
| Identifier of DCI formats | 1 |
| Frequency Domain Resource Assignment | Variable |
| Time Domain Resource Assignment | 4 |
| VRB-to-PRB Mapping | 1 |
| MCS | 5 |
| NDI | 1 |
| RV | 2 |
| HARQ Process Number | 3 or Optional |
| MSB for PUCCH Resource Indicator | 1 |
| DAI | Optional |
| TPC for PUCCH | 2 |
| LSB for PUCCH Resource Indicator | 3 |
| PUSCH to HARQ FB Timing Indicator | 3 |

PUCCH RESOURCE CONFIGURATION IN TWO-STEP RACH

CROSS REFERENCE TO RELATED APPLICATIONS

The present application claims priority to and the benefit of the U.S. Provisional Patent Application No. 62/888,325, filed Aug. 16, 2019, which is hereby incorporated by reference in its entirety as if fully set forth below in its entirety and for all applicable purposes.

TECHNICAL FIELD

This application relates to wireless communication systems, and more particularly to methods (and associated devices and systems) for improved signaling of physical uplink control channel (PUCCH) resource configuration to user equipment (UEs) during in a two-step random access procedure.

INTRODUCTION

Wireless communications systems are widely deployed to provide various types of communication content such as voice, video, packet data, messaging, broadcast, and so on. These systems may be capable of supporting communication with multiple users by sharing available system resources. A wireless multiple-access communications system may include a number of base stations (BSs), each simultaneously supporting communications for multiple communication devices, which may be otherwise known as user equipment (UE).

A UE may synchronize to a network by performing a random access procedure, including the exchange of a number of messages (e.g., 2) between the UE and a BS. After the UE transmits a random access message (also referred to a as "message A" or "msgA"), the UE monitors within a random access response window for a random access response message (also referred to as "message B" or "msgB") from the BS. The msgB includes PDCCH and physical downlink shared channel (PDSCH) portions. The BS seeks the decoding status of msgB at the UE (i.e., whether the UE was able to decode msgB) in order to determine whether msgB should be retransmitted or not. However, using a separate message to convey uplink resource allocation information for the UE to use in transmitting a decoding status adds an undesirable signaling overhead.

Thus, there is a need to handle random access procedures in a manner that is efficient and reduces signaling overhead, as well as accommodates different connection states and flexible channel structure.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE) from a base station (BS), a system information message or radio resource control (RRC) signaling. The method further includes transmitting, by the UE to the BS, a random access channel (RACH) message as part of a two-step RACH procedure. The method further includes receiving, by the UE from the BS, a RACH response message as part of the two-step RACH procedure. The method further includes determining, by the UE, physical uplink control channel (PUCCH) resources to use for a hybrid automatic repeat request (HARQ) procedure based on at least one of a system information parameter and a parameter from the two-step RACH procedure. The method further includes transmitting, by the UE to the BS, a HARQ message using the PUCCH resources.

In an additional aspect of the disclosure, a method of wireless communication includes receiving, by a user equipment (UE) from a base station (BS), a random access channel (RACH) response message as part of a two-step RACH procedure. The method further includes decoding, by the UE based on a bit length indicator for a resource indicator, a physical downlink control channel (PDCCH) of the RACH response message to obtain downlink control information (DCI) of the PDCCH, the resource indicator being based on the DCI. The method further includes determining, by the UE, physical uplink control channel (PUCCH) resources to use for a hybrid automatic repeat request (HARQ) procedure from accessing a look-up table based on the resource indicator. The method further includes transmitting, by the UE to the BS, a HARQ message using the PUCCH resources.

In an additional aspect of the disclosure, a method of wireless communication includes receiving, by a user equipment (UE) from a base station (BS), a random access channel (RACH) response message as part of a two-step RACH procedure. The method further includes decoding, by the UE, a physical downlink shared channel (PDSCH) of the RACH response message to obtain a resource indicator. The method further includes determining, by the UE, physical uplink control channel (PUCCH) resources to use for a hybrid automatic repeat request (HARQ) procedure based on the resource indicator from the PDSCH. The method further includes transmitting, by the UE to the BS, a HARQ message using the PUCCH resources.

In an additional aspect of the disclosure, a method of wireless communication includes transmitting, by a base station (BS) to a user equipment (UE), a system information message comprising default information to determine first physical uplink control channel (PUCCH) resources. The method further includes receiving, by the BS from the UE, a random access channel (RACH) message as part of a two-step RACH procedure. The method further includes including, by the BS, a first resource indicator in downlink control information (DCI) in a physical downlink control channel (PDCCH) to determine second PUCCH resources, and a second resource indicator in a physical downlink shared channel (PDSCH) to determine third PUCCH resources. The method further includes transmitting, by the BS to the UE, the PDCCH and the PDSCH as a RACH response message. The method further includes receiving, by the BS from the UE, a hybrid automatic repeat request (HARQ) message using at least one of the first PUCCH resources, the second PUCCH resources, and the third PUCCH resources.

In an additional aspect of the disclosure, a user equipment includes a transceiver configured to receive, from a base station (BS), a system information message or radio resource control (RRC) signaling; transmit, to the BS, a random access channel (RACH) message as part of a two-step RACH procedure; and receive, from the BS, a RACH response message as part of the two-step RACH procedure. The apparatus further includes a processor configured to determine physical uplink control channel (PUCCH) resources to use for a hybrid automatic repeat request (HARQ) procedure based on at least one of a system information parameter and a parameter from the two-step RACH procedure; and wherein the transceiver is further configured to transmit, to the BS, a HARQ message using the PUCCH resources.

In an additional aspect of the disclosure, a user equipment includes a transceiver configured to receive, from a base station (BS), a random access channel (RACH) response message as part of a two-step RACH procedure. The user equipment further includes a processor configured to decode, based on a bit length indicator for a resource indicator, a physical downlink control channel (PDCCH) of the RACH response message to obtain downlink control information (DCI) of the PDCCH, the resource indicator being based on the DCI; and determine physical uplink control channel (PUCCH) resources to use for a hybrid automatic repeat request (HARQ) procedure from accessing a look-up table based on the resource indicator. The user equipment further includes wherein the transceiver is further configured to transmit, to the BS, a HARQ message using the PUCCH resources.

In an additional aspect of the disclosure, a user equipment includes a transceiver configured to receive, from a base station (BS), a random access channel (RACH) response message as part of a two-step RACH procedure. The user equipment further includes a processor configured to decode a physical downlink shared channel (PDSCH) of the RACH response message to obtain a resource indicator; determine physical uplink control channel (PUCCH) resources to use for a hybrid automatic repeat request (HARQ) procedure based on the resource indicator from the PDSCH, and wherein the transceiver is further configured to transmit, to the BS, a HARQ message using the PUCCH resources.

In an additional aspect of the disclosure, a base station includes a transceiver configured to transmit, to a user equipment (UE), a system information message comprising default information to determine first physical uplink control channel (PUCCH) resources; and receive, from the UE, a random access channel (RACH) message as part of a two-step RACH procedure. The base station further includes a processor configured to include a first resource indicator in downlink control information (DCI) in a physical downlink control channel (PDCCH) to determine second PUCCH resources, and a second resource indicator in a physical downlink shared channel (PDSCH) to determine third PUCCH resources. The base station further includes wherein the transceiver is further configured to transmit, to the UE, the PDCCH and the PDSCH as a RACH response message; and receive, from the UE, a hybrid automatic repeat request (HARQ) message using at least one of the first PUCCH resources, the second PUCCH resources, and the third PUCCH resources.

In an additional aspect of the disclosure, a non-transitory computer-readable medium is provided having program code recorded thereon, the program code comprising code for causing a user equipment to receive, from a base station (BS), a system information message or radio resource control (RRC) signaling. The program code further comprises code for causing the UE to transmit, to the BS, a random access channel (RACH) message as part of a two-step RACH procedure. The program code further comprises code for causing the UE to receive, from the BS, a RACH response message as part of the two-step RACH procedure. The program code further comprises code for causing the UE to determine physical uplink control channel (PUCCH) resources to use for a hybrid automatic repeat request (HARQ) procedure based on at least one of a system information parameter and a parameter from the two-step RACH procedure. The program code further comprises code for causing the UE to transmit, to the BS, a HARQ message using the PUCCH resources.

In an additional aspect of the disclosure, a non-transitory computer-readable medium is provided having program code recorded thereon, the program code comprising code for causing a user equipment (UE) to receive, from a base station (BS), a random access channel (RACH) response message as part of a two-step RACH procedure. The program code further comprises code for causing the UE to decode, based on a bit length indicator for a resource indicator, a physical downlink control channel (PDCCH) of the RACH response message to obtain downlink control information (DCI) of the PDCCH, the resource indicator being based on the DCI. The program code further comprises code for causing the UE to determine physical uplink control channel (PUCCH) resources to use for a hybrid automatic repeat request (HARQ) procedure from accessing a look-up table based on the resource indicator. The program code further comprises code for causing the UE to transmit, to the BS, a HARQ message using the PUCCH resources.

In an additional aspect of the disclosure, a non-transitory computer-readable medium is provided having program code recorded thereon, the program code comprising code for causing a user equipment (UE) to receive, from a base station (BS), a random access channel (RACH) response message as part of a two-step RACH procedure. The program code further comprises code for causing the UE to decode a physical downlink shared channel (PDSCH) of the RACH response message to obtain a resource indicator. The program code further comprises code for causing the UE to determine physical uplink control channel (PUCCH) resources to use for a hybrid automatic repeat request (HARQ) procedure based on the resource indicator from the PDSCH. The program code further comprises code for causing the UE to transmit, to the BS, a HARQ message using the PUCCH resources.

In an additional aspect of the disclosure, a non-transitory computer-readable medium is provided having program code recorded thereon, the program code comprising code for causing a base station (BS) to transmit, to a user equipment (UE), a system information message comprising default information to determine first physical uplink control channel (PUCCH) resources. The program code further comprises code for causing the BS to receive, from the UE, a random access channel (RACH) message as part of a two-step RACH procedure. The program code further comprises code for causing the BS to include a first resource indicator in downlink control information (DCI) in a physical downlink control channel (PDCCH) to determine second PUCCH resources, and a second resource indicator in a physical downlink shared channel (PDSCH) to determine third PUCCH resources. The program code further comprises code for causing the BS to transmit, to the UE, the PDCCH and the PDSCH as a RACH response message. The program code further comprises code for causing the BS to receive, from the UE, a hybrid automatic repeat request (HARQ) message using at least one of the first PUCCH resources, the second PUCCH resources, and the third PUCCH resources.

In an additional aspect of the disclosure, a user equipment includes means for receiving, from a base station (BS), a system information message or radio resource control (RRC) signaling. The user equipment further includes means for transmitting, to the BS, a random access channel (RACH) message as part of a two-step RACH procedure. The user equipment further includes means for receiving, from the BS, a RACH response message as part of the two-step RACH procedure. The user equipment further includes means for determining physical uplink control channel (PUCCH) resources to use for a hybrid automatic repeat request (HARQ) procedure based on at least one of a system information parameter and a parameter from the two-step RACH procedure. The user equipment further includes means for transmitting, to the BS, a HARQ message using the PUCCH resources.

In an additional aspect of the disclosure, a user equipment includes means for receiving, from a base station (BS), a random access channel (RACH) response message as part of a two-step RACH procedure. The user equipment further includes means for decoding, based on a bit length indicator for a resource indicator, a physical downlink control channel (PDCCH) of the RACH response message to obtain downlink control information (DCI) of the PDCCH, the resource indicator being based on the DCI. The user equipment further includes means for determining physical uplink control channel (PUCCH) resources to use for a hybrid automatic repeat request (HARQ) procedure from accessing a look-up table based on the resource indicator. The user equipment further includes means for transmitting, to the BS, a HARQ message using the PUCCH resources.

In an additional aspect of the disclosure, a user equipment includes means for receiving, from a base station (BS), a random access channel (RACH) response message as part of a two-step RACH procedure. The user equipment further includes means for decoding a physical downlink shared channel (PDSCH) of the RACH response message to obtain a resource indicator. The user equipment further includes means for determining physical uplink control channel (PUCCH) resources to use for a hybrid automatic repeat request (HARQ) procedure based on the resource indicator from the PDSCH. The user equipment further includes means for transmitting, to the BS, a HARQ message using the PUCCH resources.

In an additional aspect of the disclosure, a base station includes means for transmitting, to a user equipment (UE), a system information message comprising default information to determine first physical uplink control channel (PUCCH) resources. The base station further includes means for receiving, from the UE, a random access channel (RACH) message as part of a two-step RACH procedure. The base station further includes means for including a first resource indicator in downlink control information (DCI) in a physical downlink control channel (PDCCH) to determine second PUCCH resources, and a second resource indicator in a physical downlink shared channel (PDSCH) to determine third PUCCH resources. The base station further includes means for transmitting, to the UE, the PDCCH and the PDSCH as a RACH response message. The base station further includes means for receiving, from the UE, a hybrid automatic repeat request (HARQ) message using at least one of the first PUCCH resources, the second PUCCH resources, and the third PUCCH resources.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

FIG. 5A illustrates a look-up table format according to some embodiments of the present disclosure.

FIG. 5B illustrates a look-up table format according to some embodiments of the present disclosure.

FIG. 6A illustrates a downlink control information format according to some embodiments of the present disclosure.

FIG. 6B illustrates a downlink control information format according to some embodiments of the present disclosure.

DETAILED DESCRIPTION

Figure 1:
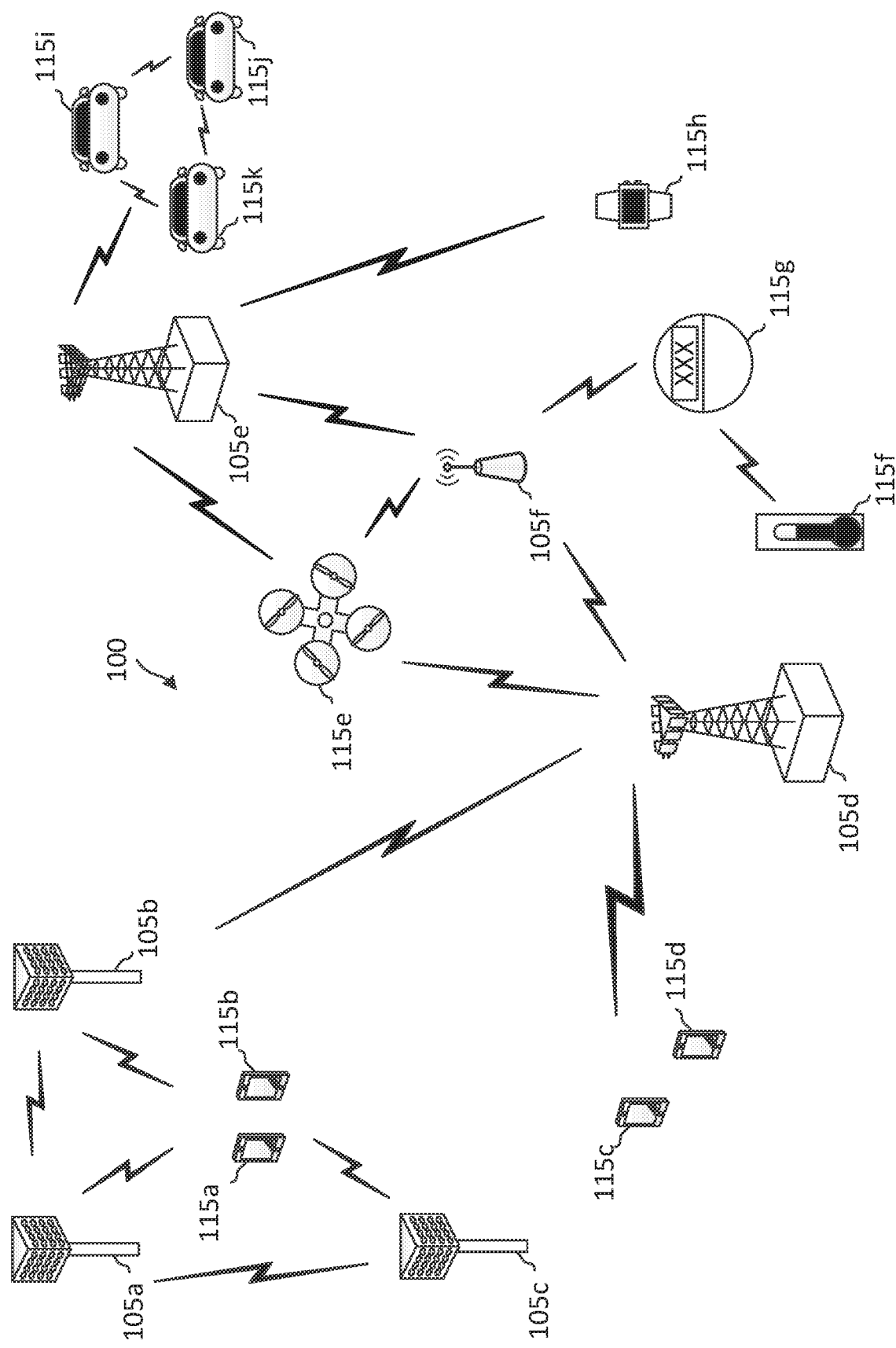
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms to implement a scalable PUCCH resource configuration for two-step RACH by signaling PUCCH configuration information to a UE via multiple mechanisms. The PUCCH configuration information is then used for transmitting a HARQ message. In some embodiments multiple PUCCH resource scheduling approaches are used to provide flexibility at a UE to obtain the PUCCH resource scheduling, with a tiered hierarchy of preference in which signaled PUCCH resource scheduling to use.

For example, a UE may receive a system information message (or radio resource control (RRC) message, referred to jointly herein as simply system information message for simplicity of discussion) that includes default PUCCH resource configuration information (e.g., a limited set of semi-persistent configurations), as well as one or more indications of what type of downlink control information (DCI) format may be signaled in PDCCH of a RACH response message (msgB) later from a BS. After the UE transmits a RACH message (msgA) to the BS, the BS responds with msgB that includes a PUCCH resource indicator in a DCI of PDCCH, as well as another PUCCH resource indicator in a PDSCH payload of the msgB.

The UE, upon receiving msgB, attempts to decode PDCCH and then PDSCH. If the UE is successful in decoding both PDCCH and PDSCH, then the UE will use the PUCCH resource configuration indicated in the PDSCH payload. If, instead, the UE is successful in decoding PDCCH but not PDSCH of the msgB, then the UE will use the PUCCH resource configuration indicated in the PDCCH DCI. Where the UE is not successful in decoding PDCCH, the UE may use the default PUCCH resource configuration information. With the corresponding PUCCH resource configuration information obtained (either from PDSCH, PDCCH, or default from system information), the UE signals a HARQ message (ACK/NACK) to the BS based on whether receiving msgB was successful or not.

Aspects of the present application provide several benefits. For example, using this PUCCH resource configuration information signaling approach accommodates different RRC states and msgB decoding outcomes, as well as supports flexibility in the msgB channel structure. Further, embodiments of the present disclosure reduce signaling overhead for PUCCH resource configuration by not requiring a separate channel from the BS after msgB is sent. Scalable resource configuration for PUCCH is also supported, and embodiments of the present disclosure also comply with PUCCH formats defined in existing releases. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 may perform a random access procedure to establish a connection with the BS 105. In a four-step random access procedure, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response may be referred to as a message 1 (MSG 1), a message 2 (MSG 2), a message 3 (MSG 3), and a message 4 (MSG 4), respectively. According to embodiments of the present disclosure, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (msgA). The combined random access response and connection response in the two-step random access procedure may be referred to as a message B (msgB).

After establishing a connection, the UE 115 and the BS 105 can enter an operational state, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some embodiments, the BS 105 and the UE 115 may employ hybrid automatic request (HARQ) PUCCH resource scheduling techniques for RACH communications to reduce overhead and latency, with signaling of resources for HARQ described in greater detail below. For example, in some embodiments multiple PUCCH resource scheduling approaches are used to provide flexibility at a UE to obtain the PUCCH resource scheduling. One of the PUCCH scheduling approaches utilizes system information.

When the BS 105 broadcasts system information associated with the network (e.g., prior to a RACH procedure by the UE, or an updated RACH procedure, etc.), the BS 105 may include according to embodiments of the present disclosure various configuration parameters relating to a RACH procedure. For example, the system information may include default PUCCH resource configuration information that the UE may use when other sources of PUCCH resource configuration information, such as in a DCI or PDSCH (as discussed further below), are not available due to decoding failure. The default PUCCH resource configuration information may include, for example, a default resource indicator that serves as an index into a look-up table. The look-up table may provide most or all of the PUCCH parameters necessary for the PUCCH resource configuration for a HARQ transmission (whether ACK or NACK). The look-up table, itself, may be conveyed with the system information message as well, or configured previously at the UE and the BS. Further, some of the transmission parameters may be configurable in combination with the information from the system information message, such as cyclic shift. Thus, most of the PUCCH parameters are obtained from the look-up table, while the cyclic shift may be determined based on a parameter msgA that the UE sends at the start of the RACH procedure (e.g., a resource index like the preamble sequence index when combined with the cyclic shift identified from the look-up table entry).

Another example of one of the PUCCH scheduling approaches utilizes providing a resource indicator in DCI for a PDCCH part of a msgB from the BS 105. Scheduling/communicating the PUCCH resources via the PDCCH of msgB may be utilized in situations where PUCCH resource indication is not available via the PDSCH of msgB (e.g., due to a decoding failure of PDSCH, etc.). Further, PUCCH resource indication may take priority over the default indication based upon the system information.

In the PUCCH resource indication approach, the system information message may also (or alternatively) include a bit length indicator (also referred to herein as a variable, N, for purposes of discussion) that identifies what the size (in bits) a resource indicator will be that is included in a msgB's DCI (in PDCCH). The receiving UE 115 may use this value N to recognize the location of the resource indicator in PDCCH's DCI when the UE 115 receives a msgB from the BS 105. For example, if the PUCCH resources for HARQ are scheduled from a shortened look-up table (e.g., 8 rows instead of 16 rows), the DCI may utilize the three bits for the PUCCH resource indicator that is currently used in DCI format 1_0 (as an example). As another example, if the PUCCH resources are scheduled from a larger look-up table (e.g., 16 rows), other fields of a DCI, such as of DCI format 1_0, may be modified to carry information relating to the resource indicator instead (or a new, custom DCI format may be implemented that is different from existing formats like format 1_0). Again, the look-up table may provide most or all of the PUCCH parameters the UE 115 will use to send a HARQ transmission to the BS 105.

The PUCCH resource indication approach may also utilize additional information to accommodate configuration options that exceed a DCI field size available for PUCCH resource indication. For example, the system information message may also include an identification that will trigger the UE 115 to use a resource offset while determining PUCCH resources for a HARQ message during a RACH procedure. For example, the system information message may identify a configuration parameter, or a combination of configuration parameters, that will be used in a subsequent RACH procedure involving the UE 115. Some example configuration parameters include the msgA preamble sequence identifier, msgA preamble occasion index, msgA PUSCH occasion, msgB-RNTI, CORESET/search space index for msgB PDCCH, etc., or some combination of parameters as identified by the system information message. Such configuration parameters may be used in combination with a resource indicator to add a resource offset to the PUCCH resources determined from indexing into a look-up table (e.g., using the resource indicator). As a result, a look-up table larger than existing tables (e.g., with more than 16 entries) may not be necessary, as the resource offset provides further modification to the existing entries to provide the additional resource scheduling options for the UE 115.

Another example of PUCCH scheduling approaches utilizes PUCCH resource indication in the PDSCH of the msgB. For example, where the UE 115 receiving msgB from BS 105 during a two-step RACH procedure is able to decode PDCCH and PDSCH, the UE 115 will prioritize using the PUCCH resource indication provided in the PDSCH over the other approaches (indication in DCI of PDCCH, and/or default configuration information from the system information message). This allows the PUCCH resources to be dynamically configured by RRC protocol, for example, or alternatively hard-coded. For example, dynamic configuration may include the PDSCH signaling a set a configuration parameters that have been dynamically selected, including for example starting location of physical resource blocks (PRB) or PRB offset in the frequency domain, intra-slot frequency hopping, second hop PRB offset, first symbol, number of symbols, initial indices for cyclic shift, number of PRBs, time domain orthogonal cover code (OCC), OCC length, OCC index, inter-slot frequency hopping, additional demodulation reference signal (DMRS) configuration, maximum code rate, number slots, support for $\pi/2$ binary phase shift keying (BPSK), and/or support for simultaneous HARQ ACK and CSI, some subset or combination of these, etc. As another example, hard-coded configuration may include utilizing either the longer (e.g., 16-entry) or shorter (e.g., 8-entry) tables as introduced above and discussed further below with respect to FIGS. 5A-5B.

Providing the PUCCH resource indication in the PDSCH of msgB from BS 105 may be done with a unicast message to UE 115 (generally, targeting one UE that has started a RACH procedure) or multicast message to multiple UEs 115 (generally, targeting multiple UEs that have all started a RACH procedure, such as in the same RACH occasion). For the multicast, the payload may include information for each UE 115 receiving msgB (specifically PDSCH of msgB) consecutive to the last, so that UE2 follows UE1, UE3 follows UE2, etc. Whether the resource configuration is dynamically configured or hard-coded, using PDSCH for resource indication allows for signaling additional information with the PUCCH resource indication. In addition to the PUCCH resource configuration information, the payload may include an identifier of each UE such as contention resolution identifier, C-RNTI, or both.

Thus, at a high level, the BS 105 may signal a variety of PUCCH resource configurations to the UE 115 engaged in a RACH procedure that the UE 115 may use to transmit an ACK or a NACK in a HARQ message after receipt of msgB. Specifically, in a descending hierarchy of use, the UE 115 may first attempt to use the PUCCH resources identified via PDSCH signaling. If that is not available, then the UE 115 may then revert to the PUCCH resources identified via PDCCH signaling. If that is also not available, then the UE 115 may revert to using the default PUCCH resources identified via earlier system information signaling. These approaches, and their interplay, will be discussed in more detail below with respect to the subsequent figures. According to embodiments of the present disclosure, different RRC states and msgB decoding outcomes may be accommodated, msgB channel structure flexibility is supported, signaling overhead for PUCCH resource configuration is reduced, scalable resource configuration for PUCCH is supported, and compatibility with newer PUCCH format definitions is facilitated.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2:
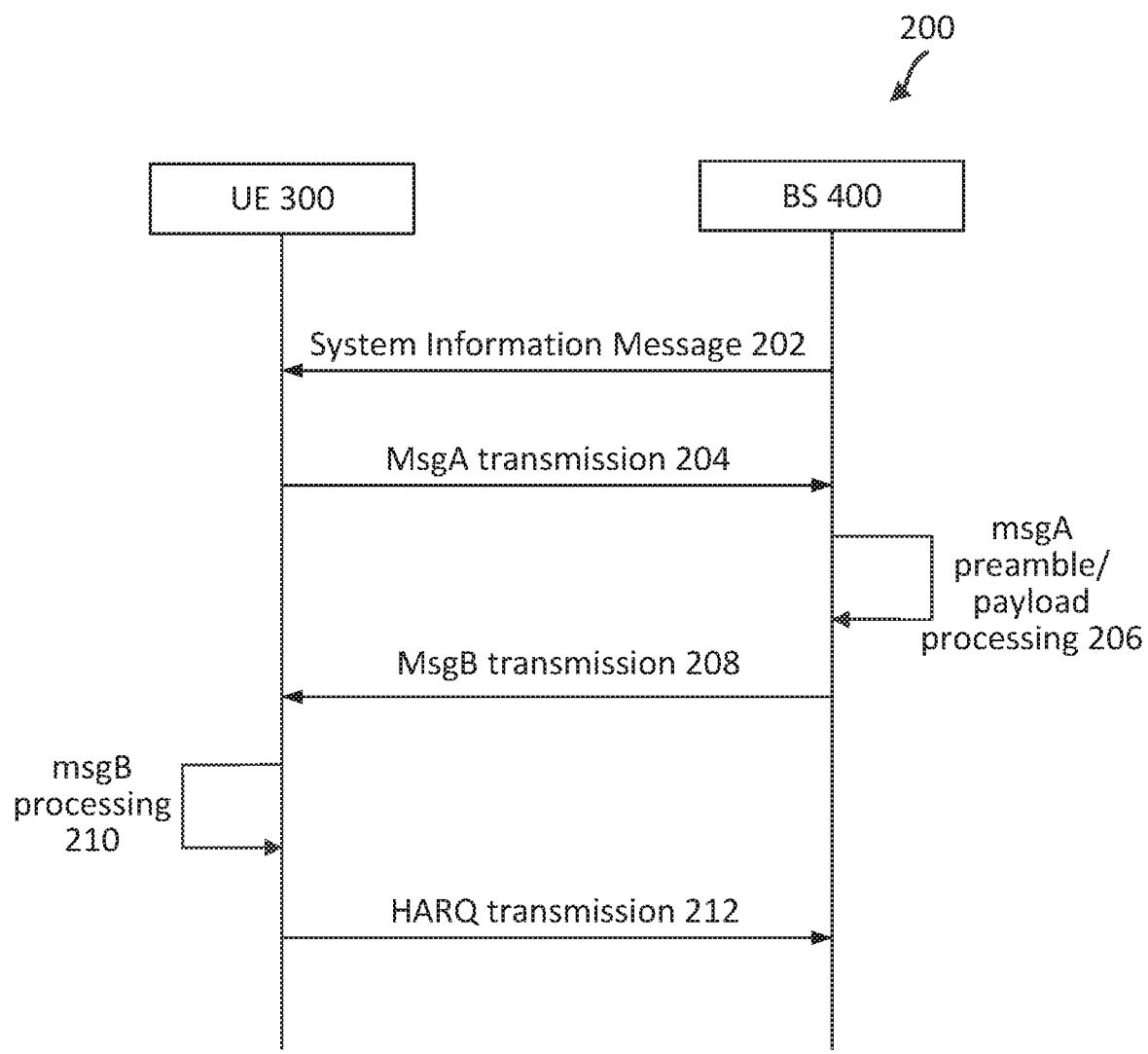
FIG. 2 illustrates a protocol diagram of a wireless communication method according to some embodiments of the present disclosure.

FIG. 2 illustrates a protocol diagram of a wireless communication method 200, particularly a random access procedure 200 with HARQ, between a UE 300 (of which UEs 115 are examples) and a BS 400 (of which BSs 105 are examples) according to some embodiments of the present disclosure. The random access procedure 200 may include a two-step random access procedure, where the UE 300 transmits a random access preamble and a connection request in a single transmission and the BS 400 may respond by transmitting a random access response and a connection response in a single transmission. In the two-step random access procedure, the combined random access preamble and connection request may be referred to as a message A (MSG A), while the combined random access response and connection response may be referred to as a message B (MSG B).

At action 202, the BS 400 transmits a system information message to the UE 300. The system information message may include various configuration parameters for the subsequent determination of PUCCH resources at the UE 300. For example, the system information message (as relevant to discussion herein—other information is further included in the system information message that is not discussed herein) may include default PUCCH resource configuration information including a default resource indicator, as well as bit length size for a resource indicator signaled via PDCCH DCI, and/or identification of RACH message parameter(s) to use when determining a resource indicator. The system information message may also include one or more look-up tables, or updates to look-up tables stored at the UE 300.

Following transmission of the system information message, the UE 300 may initiate a RACH procedure. This may occur when the UE is any of a variety of RRC states, including for example RRC idle/inactive state, or RRC connected. To do so, at action 204, the UE 300 transmits msgA to the BS 400. As noted above, msgA may include a combination of the random access preamble and connection request (as well as other information, such as a tracking area update, a scheduling request, and a UE identifier).

At action 206, the BS 400 processes the preamble and payload received in the msgA from UE 300 from action 204. As part of this processing, for example, the BS 400 may dynamically determine one or more PUCCH resources to include in the PDSCH (payload) portion of msgB that the BS 400 will send back to UE 300. Further, the BS 400 may encode into DCI of the msgB's PDCCH further PUCCH resources for the UE 300 to use in the event that decoding of the PDSCH of msgB fails. In addition to the PDCCH and PDSCH resource scheduling information for PUCCH for HARQ messaging, the BS 400 may further include other information into the msgB including a detected random access preamble ID, TA information, a C-RNTI, a backoff indicator, and a contention resolution.

At action 208, the BS 400 transmits the generated msgB (which includes PUCCH resource indications in PDCCH and PDSCH portions) to the UE 300.

At action 210, the UE 300 receives the msgB from BS 400 and processes the message. This includes, first, decoding the PDCCH. If successful, the UE 300 obtains from the PDCCH the information it needs to decode PDSCH, as well as PUCCH resource scheduling information to use for HARQ messaging in the event that decoding the PDSCH of msgB fails. If the UE 300 is also successful in decoding the PDSCH of msgB, then the UE 300 will obtain the PUCCH resource scheduling information that BS 400 included in PDSCH, and which will take precedence in use for a HARQ message.

At action 212, the UE 300 transmits a HARQ message to the BS 400. This may be an ACK if receipt of msgB was successful, or NACK if unsuccessful. For example, if the UE 300 was able to decode PDCCH but not PDSCH, according to embodiments of the present disclosure the UE 300 may use the PUCCH resource scheduling information it obtained from the DCI of the PDCCH in msgB to transmit a HARQ NACK to the BS 400. Alternatively, if decoding the PDCCH was unsuccessful, the UE 300 may instead use the default PUCCH resource scheduling information it obtained from the system information message (e.g., action 202 in this example) to transmit a HARQ NACK to the BS 400. As another example, if decoding PDCCH and PDSCH of msgB is successful, the UE 300 may use the PUCCH resource scheduling information obtained from the PDSCH to transmit a HARQ ACK to the BS 400. As will be recognized, the UE 300 may alternatively use PUCCH resource scheduling information from the PDCCH and/or system information message to transmit a HARQ ACK to the BS 400 as well according to embodiments of the present disclosure.

Figure 3:
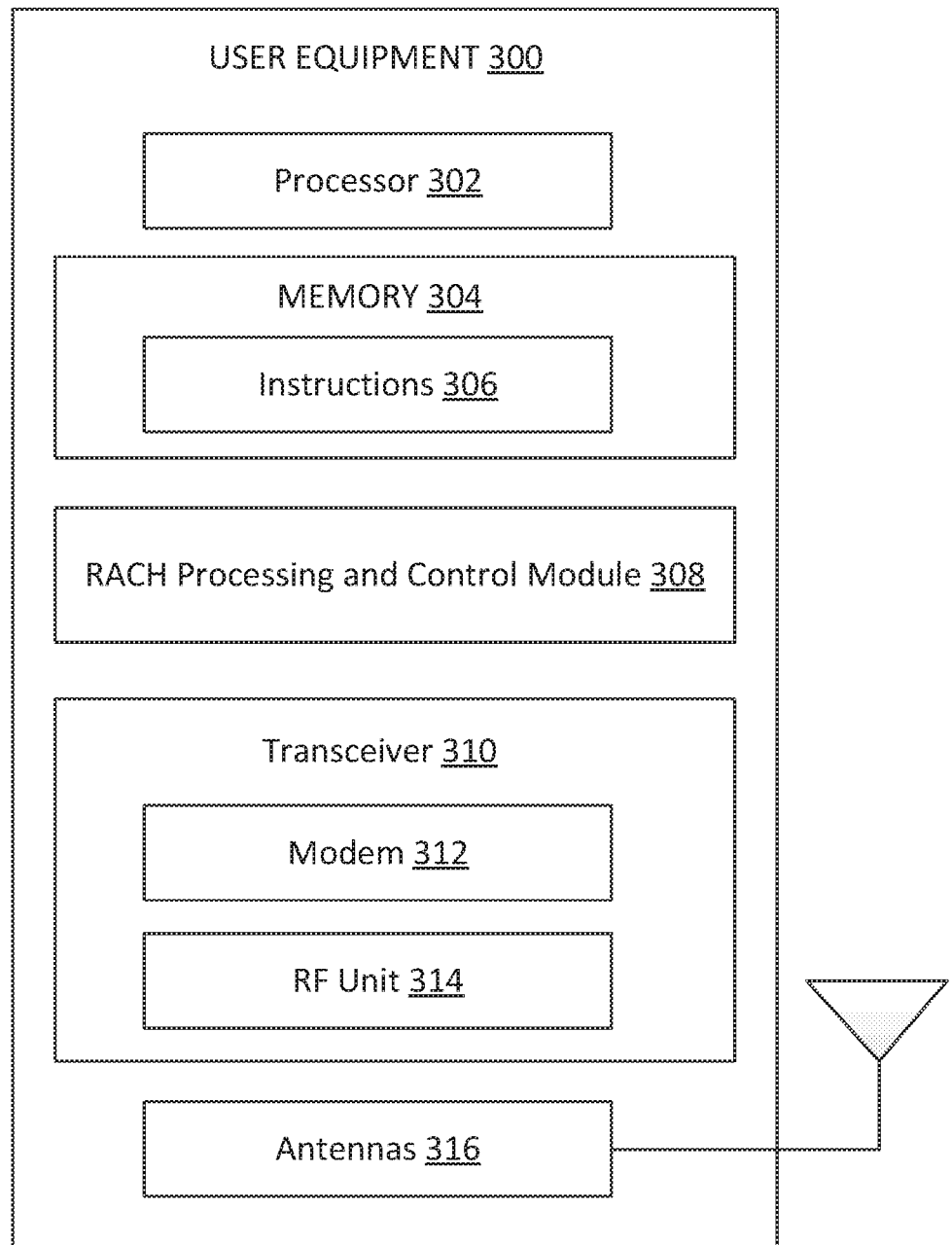
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 discussed above in FIGS. 1 and 2. As shown, the UE 300 may include a processor 302, a memory 304, a RACH processing and control module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with embodiments of the present disclosure, for example, aspects of FIGS. 1-2, 5A-8, 10, and 12. Instructions 306 may also be referred to as program code. The program code may be for causing a wireless communication device (or specific component(s) of the wireless communication device) to perform these operations, for example by causing one or more processors (such as processor 302) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The RACH processing and control module 308 may be implemented via hardware, software, or combinations thereof. For example, RACH processing and control module 308 may be implemented as a processor, circuit, and/or instructions 306 stored in the memory 304 and executed by the processor 302. In some examples, the RACH processing and control module 308 can be integrated within the modem subsystem 312. For example, the RACH processing and control module 308 can be implemented by a combination of software components (e.g., executed by a DSP or a general processor) and hardware components (e.g., logic gates and circuitry) within the modem subsystem 312.

The RACH processing and control module 308 may be used for various aspects of the present disclosure, for example, aspects of FIGS. 1-2, 5A-8, 10, and 12. The RACH processing and control module 308 is configured to communicate with other components of the UE 300 to transmit of one or more RACH messages (e.g., msgA), receive one or more RACH messages (e.g., msgB), receive and determine PUCCH resource scheduling information from one or more of system information messaging, PDCCH, and/or PDSCH of msgB messaging, perform HARQ processing on one or more RACH messages (e.g., msgB), transmit an ACK/NACK for one or more RACH messages (e.g., msgB) using determined PUCCH resources according to embodiments of the present disclosure, determine whether a timer has expired, start a timer, cancel a timer, stop a timer, determine whether a transmission counter has reached a threshold, reset a transmission counter, restart a random access procedure, trigger RLF, and/or perform other functionalities related to the RACH procedures of a UE described in the present disclosure.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the RACH processing and control module 308 according to a modulation and coding scheme (MCS) (e.g., a low-density parity check (LDPC) coding scheme, a turbo coding scheme, a convolutional coding scheme, a digital beamforming scheme, etc.). The RF unit 314 may be configured to process (e.g., perform analog to digital conversion or digital to analog conversion, etc.) modulated/encoded data (e.g., UL data bursts, RRC messages, RACH message(s) (e.g., msgA), ACK/NACKs for DL data bursts) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 300 to enable the UE 300 to communicate with other devices.

The RF unit 314 may provide the modulated and/or processed data (e.g., data packets or, more generally, data messages that may contain one or more data packets and other information) to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., system information message(s), RACH message(s) (e.g., msgB including PUCCH resource scheduling information), DL/UL scheduling grants, DL data bursts, RACH messages, RRC messages, ACK/NACK requests) to the RACH processing and control module 308 for processing. The antennas 316 may include multiple antennas of similar or different designs in order to sustain multiple transmission links. The RF unit 314 may configure the antennas 316.

In an embodiment, the UE 300 can include multiple transceivers 310 implementing different RATs (e.g., NR and LTE). In an embodiment, the UE 300 can include a single transceiver 310 implementing multiple RATs (e.g., NR and LTE). In an embodiment, the transceiver 310 can include various components, where different combinations of components can implement different RATs.

Figure 4:
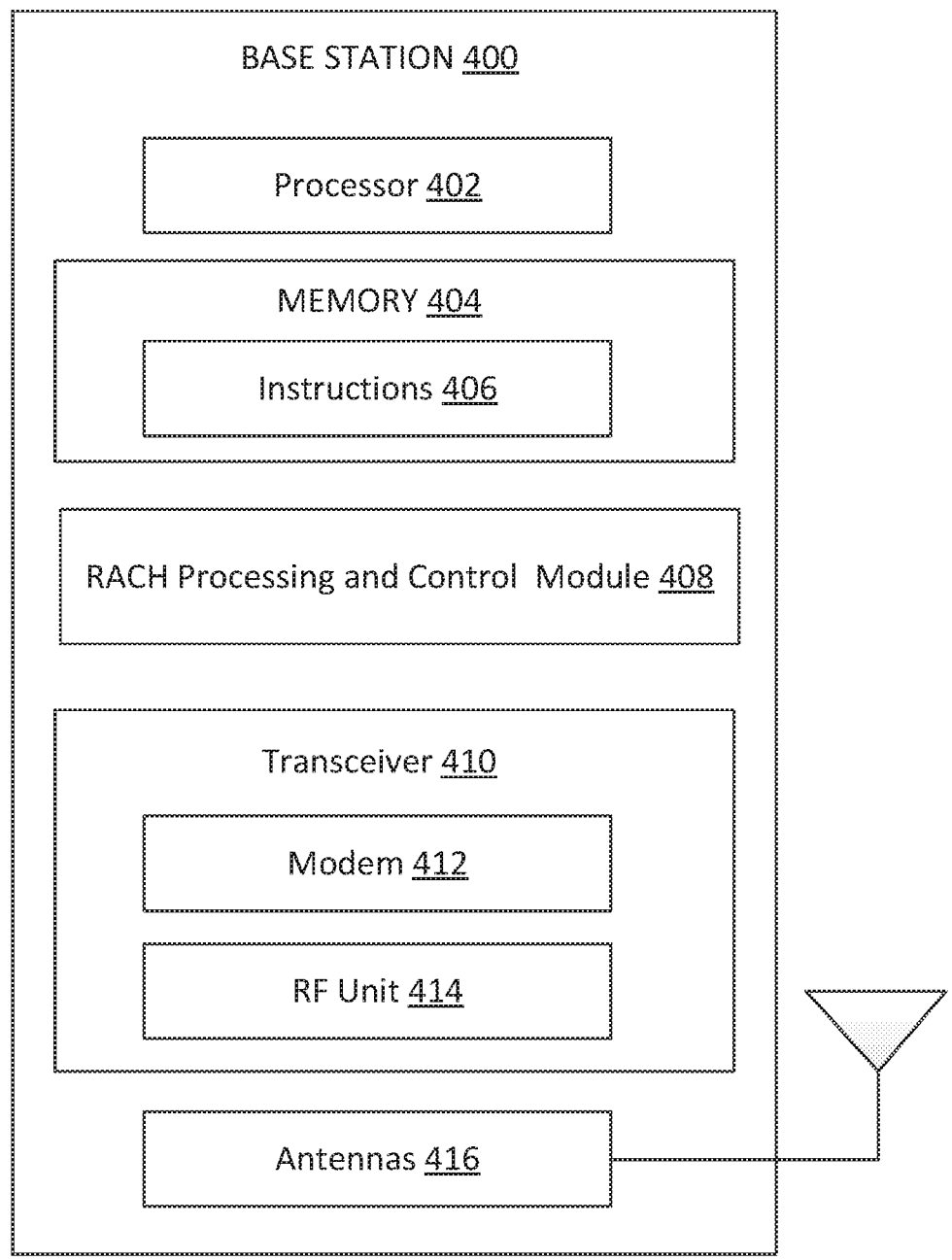
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above in FIGS. 1 and 2. As shown, the BS 400 may include a processor 402, a memory 404, a RACH processing and control module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1-2, 5A-7, 9, 11, and 13. Instructions 406 may also be referred to as code, which may be interpreted broadly to include any type of computer-readable statement(s) as discussed above with respect to FIG. 3.

The RACH processing and control module 408 may be implemented via hardware, software, or combinations thereof. For example, the RACH processing and control module 408 may be implemented as a processor, circuit, and/or instructions 406 stored in the memory 404 and executed by the processor 402. In some examples, the RACH processing and control module 408 can be integrated within the modem subsystem 412. For example, the RACH processing and control module 408 can be implemented by a combination of software components (e.g., executed by a DSP or a general processor) and hardware components (e.g., logic gates and circuitry) within the modem subsystem 412.

The RACH processing and control module 408 may be used for various aspects of the present disclosure, for example, aspects of FIGS. 1-2, 5A-7, 9, 11, and 13. The RACH processing and control module 408 is configured to include transmit or retransmit one or more RACH messages having a timing advance (TA) command to a UE (e.g., the UEs 115 and/or 300), receive an ACK/NACK for one or more of the transmitted or retransmitted RACH messages, transmit one or more DL scheduling grants to a UE indicating DL resources (e.g., time-frequency resources), transmit DL data to the UE, transmit one or more UL scheduling grants to the UE indicating UL resources, receive UL data from the UE, etc.

The RACH processing and control module 408 is configured to communicate with other components of the BS 400 to receive of one or more RACH messages (e.g., msgA), include PUCCH resource scheduling information into system information messages and/or RACH messages (e.g., msgB), transmit one or more system information messages, transmit one or more RACH messages (e.g., msgB), perform HARQ processing on one or more RACH messages (e.g., msgB), receive an ACK/NACK for one or more RACH messages (e.g., msgB), determine whether a timer has expired, start a timer, cancel a timer, determine whether a transmission counter has reached a threshold, reset a transmission counter, terminate a random access procedure, and/ or perform other functionalities related to the RACH procedures of a BS described in the present disclosure.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS (e.g., a LDPC coding scheme, a turbo coding scheme, a convolutional coding scheme, a digital beamforming scheme, etc.). The RF unit 414 may be configured to process (e.g., perform analog to digital conversion or digital to analog conversion, etc.) modulated/encoded data (e.g., RACH messages (e.g., msgB, etc.), ACK/NACK requests, DL/UL scheduling grants, DL data, RRC messages, etc.) from the modem subsystem 412 (on outbound transmissions) or of transmissions originating from another source, such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 400 to enable the BS 400 to communicate with other devices.

The RF unit 414 may provide the modulated and/or processed data, (e.g., data packets or, more generally, data messages that may contain one or more data packets and other information) to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The transceiver 410 may provide the demodulated and decoded data (e.g., RACH message(s) (e.g., msgA), ACK/ NACKs for RACH message(s) (e.g., ACK/NACK for msgB), UL data, ACK/NACKs for DL data, etc.) to the RACH processing and control module 408 for processing. The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement different RATs.

FIGS. 5A and 5B illustrate look-up table formats to be used in identifying PUCCH resources (e.g., using resource indicators as included in msgB and/or system information messages from the BS) in accordance with the present disclosure.

As shown in FIG. 5A, a look-up table 500 consists of multiple rows 502-516, where each row includes a set of PUCCH configuration parameters including time/frequency resource assignments, indices, etc. As illustrated, for example, look-up table 500 includes the parameters index 504, PUCCH format 506, first symbol 508, number of symbols 510, PRB offset 512, and initial cyclic shift index sets 514. In FIG. 5A's illustrated example, there are a total of 16 rows in the look-up table 500. To signal what row to index into for PUCCH configuration parameters (i.e., PUCCH resource scheduling information), four bits (to uniquely identify all 16 rows) may be used in PDCCH signaling as discussed further below.

According to some embodiments of the present disclosure, instead of 16 rows a look-up table may have a reduced number of entries. For example, FIG. 5B illustrates an example look-up table 530 with reduced number of entries (as compared to the look-up table 500 of FIG. 5A). In the illustrated example, there are 8 total rows identified as rows 502-518 (more or fewer may also be possible and within the scope of this disclosure). The rows 502-518 may be a subset of those rows 502-516 illustrated in table 500 of FIG. 5A, or different. To signal what row to index into for PUCCH configuration parameters in look-up table 530, three bits may be used to uniquely identify all 8 rows in PDCCH signaling, as will be discussed further below.

Thus, as discussed in more detail in other aspects of this disclosure, when referencing a look-up table, embodiments of the present disclosure may index (e.g., using some form of resource indicator according to the various embodiments herein) into a specific row of the relevant look-up table—e.g., look-up table 500 when the BS 105 relies upon a full-sized table, or look-up table 530 when relying upon a reduced-size table.

In order to signal the resource indicator information used to index into the look-up table (500/530), embodiments of the present disclosure may use a combination of information included in a system information message, DCI in a msgB PDCCH, and/or payload information included in a msgB PDSCH. Several DCI formats are illustrated in FIGS. 6A-6B according to some embodiments of the present disclosure.

For example, FIG. 6A illustrates an example DCI format 600 with multiple fields that may be purposed with conveying a resource indicator for PUCCH configuration parameters according to some embodiments of the present disclosure. For example, DCI format 600 repurposes DCI format 1_0 for conveying the PUCCH resource indicator field to identify the PUCCH the UE 115 will use for HARQ messaging in response to msgB from BS 105. However, according to embodiments of the present disclosure, the CRC is masked by msgB-RNTI as opposed to C-RNTI as previously used. As illustrated, row 602 identifies the PUCCH Resource Indicator, i.e. the PUCCH resource indicator used to index into a look-up table. As identified in row 602, the PUCCH resource indicator is 3 bits wide. Thus, the DCI format 600 may be used to index into a reduced-entry number look-up table, such as look-up table 530 illustrated in FIG. 5B, since three bits are enough to uniquely identify all eight rows of the table 530.

For indexing into a larger table, such as the look-up table 500 illustrated in FIG. 5A that has 16 row entries, a modified DCI format 630 as illustrated in FIG. 6B may be used instead. Like DCI format 600, the CRC is masked by msgB-RNTI instead of C-RNTI.

As illustrated in FIG. 6B, the DCI format 630 modifies and/or repurposes use of several bit fields to signal the PUCCH resource indicator to the UE 115. For example, row 632 that traditionally conveys the HARQ process number with four bits, is modified in FIG. 6B to be optional. When included, the HARQ process number in DCI format 630 has a bit width of three. The fourth bit is repurposed for a new field illustrated at row 634 as the most significant bit (MSB) for the PUCCH resource indicator. Thus, for a four-bit PUCCH resource indicator, the MSB would be included in this repurposed field. The rest of the four-bit PUCCH resource indicator is included in the LSB for PUCCH resource indicator field illustrated at row 638 of FIG. 6B. This field is repurposed from the PUCCH resource indicator field at row 602 of FIG. 6A, using the three available bits to convey the remaining bits of the four-bit PUCCH resource indicator (i.e., the LSB after the MSB). The UE 115, upon receiving the DCI format 630 in a PDCCH, would access both fields and combine them together to form the full PUCCH resource indicator for subsequent indexing into the appropriate row of a look-up table.

Continuing with the other fields of DCI format 630, similar to HARQ process number, the downlink assignment index (DAI) illustrated at row 636 is modified to be optional (previously occupying two bits in DCI format 1_0). This field, as well as the now-optional HARQ process number, may instead be repurposed to convey other information (if any). While illustrated and described as a repurposed DCI format, DCI format 630 may alternatively be a custom format with fields specifically designed to accommodate the signaling according to embodiments of the present disclosure, such as at least one field that is four bits in width for the PUCCH four-bit resource indicator.

A UE 115 may recognize whether to look for DCI format 600 (FIG. 6A) or DCI format 630 (FIG. 6B) based on information signaled in a system information message previously, such as the system information message illustrated at action 202 in FIG. 2 discussed above. This may be conveyed as a variable N, where if set to three the UE 115 will look in the table for a three-bit-wide PUCCH resource indicator such as the field illustrated in FIG. 6A. Alternatively, if set to four the UE 115 with either look in the table for a MSB field and an LSB field (as illustrated in FIG. 6B), or a four-bit-wide custom field (with a new, custom DCI format alternative), to obtain a full four-bit-wide PUCCH resource indicator.

Figure 7:
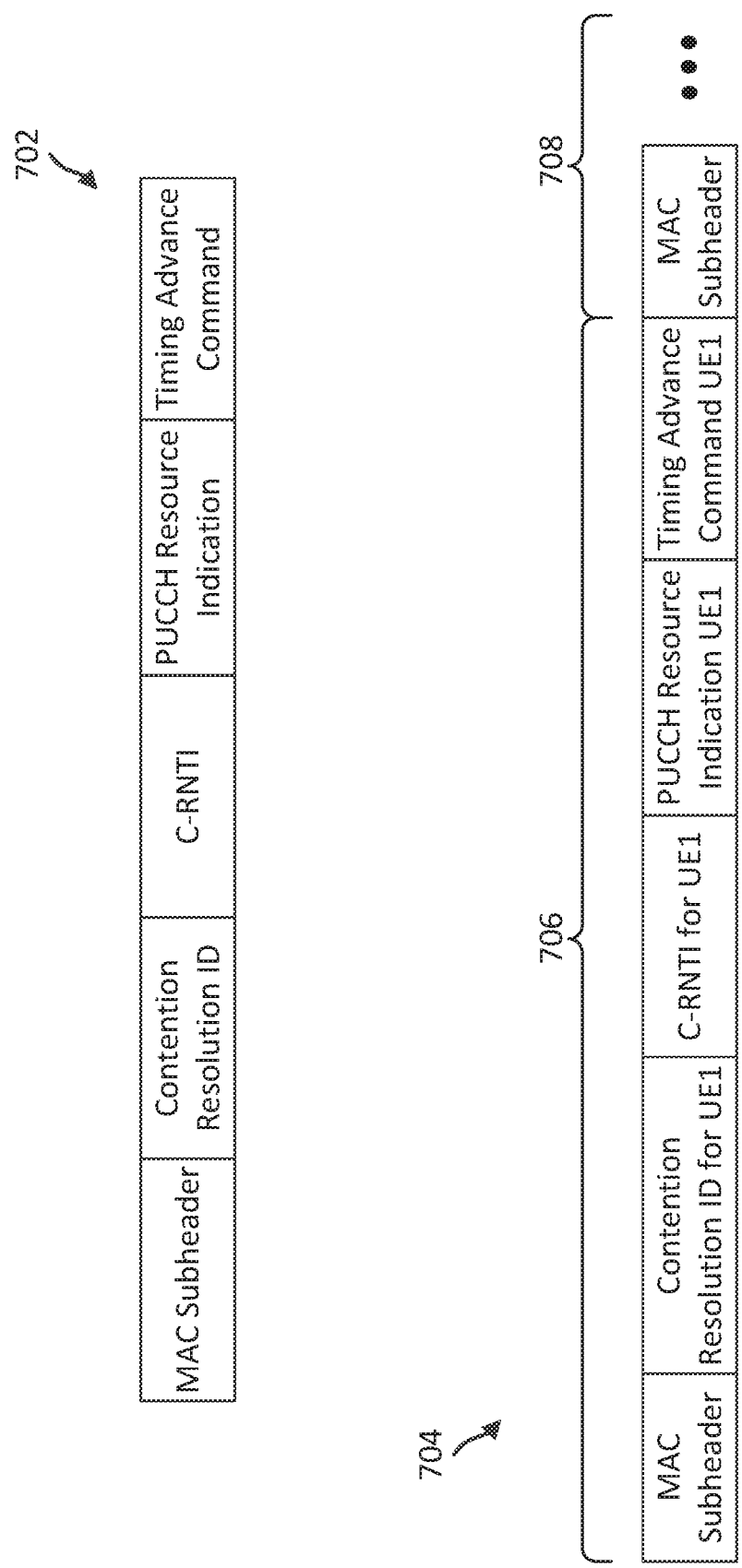
FIG. 7 illustrates a PDSCH message payload structure according to some embodiments of the present disclosure.

In addition to signaling PUCCH resource indicator information via DCI in a PDCCH of a msgB from BS 105, the PUCCH resource indicator may also be conveyed via PDSCH in msgB. Exemplary PDSCH message payload structures are illustrated in FIG. 7 according to some embodiments of the present disclosure. FIG. 7 illustrates first a unicast PDSCH message payload structure 702 for a targeted UE 115. This includes a MAC subheader, a contention resolution ID, the C-RNTI of the specific UE, a PUCCH resource indication (either dynamic information or hard-coded PUCCH resource indicator that indexes into a look-up table as discussed in the embodiments herein), and a timing advance command. While illustrated as including both contention resolution ID and C-RNTI, in some embodiments either one or the other may be included in the PDSCH message payload structure 702 for a unicast message to a UE 115.

FIG. 7 further illustrates a multicast PDSCH message payload structure 704, which includes messages to multiple UEs 115 that share the same RACH occasion. As illustrated, there are two separate payloads 706 and 708. This is exemplary, as the multicast PDSCH message payload structure 704 may include more payloads than those illustrated according to embodiments of the present disclosure. The two provided are for sake of illustration of examples herein. The payload 706 includes information for the first UE, UE1 in the example, for which the PUCCH resource information is being transmitted (via PDSCH of msgB) to the UE1. Thus, it includes the contention resolution ID and/or C-RNTI currently associated with the UE1. Following payload 706 is payload 708, including PUCCH resource information for UE2 (which is likewise engaged in a RACH procedure at the time). Thus, it includes contention resolution ID and/or C-RNTI currently associated with UE2, together with the PUCCH resource information for UE2. This continues in like manner for any number of UEs that the BS 105 multicasts a msgB to in a RACH procedure.

According to embodiments of the present disclosure, as previously noted the UE 115 may receive different PUCCH resource indications via system information, msgB PDCCH, and msgB PDSCH. Each may be partially or wholly different from the others. Thus, embodiments of the present disclosure also describe a tiered approach towards determining which PUCCH resource indication to use to transmit HARQ back to the BS 105 after receiving a msgB.

Figure 8:
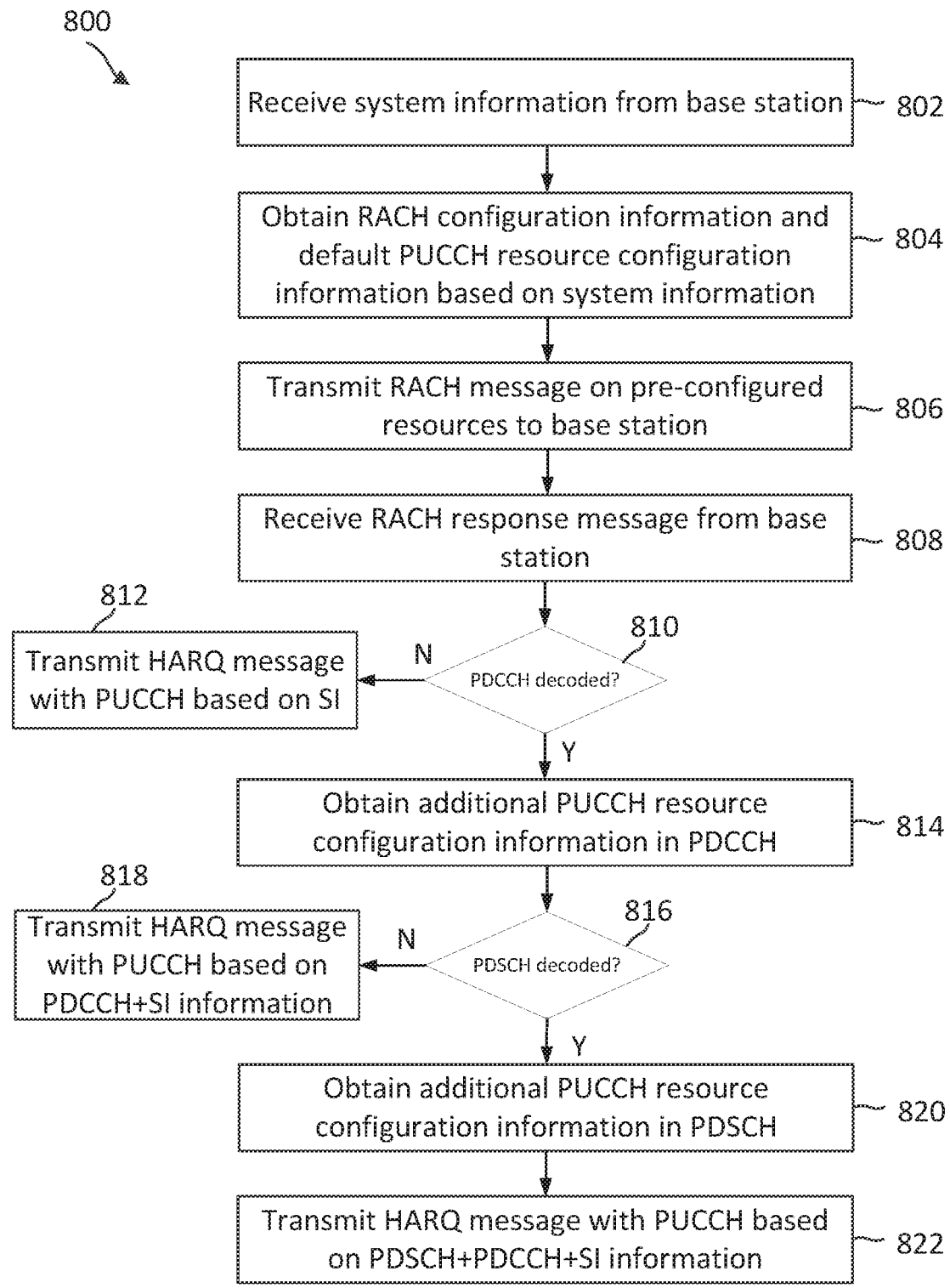
FIG. 8 illustrates a flow diagram of a wireless communication method according to some embodiments of the present disclosure.

FIG. 8 illustrates a flow diagram of a wireless communication method 800 that implements a tiered approach according to some embodiments of the present disclosure. Aspects of the method 800 can be executed by a wireless communication device, such as the UEs 115 and/or 300 utilizing one or more components, such as the processor 302, the memory 304, the RACH communication and processing module 308, the transceiver 310, the modem 312, the one or more antennas 316, and various combinations thereof. As illustrated, the method 800 includes a number of enumerated steps, but embodiments of the method 800 may include additional steps before, during, after, and in between the enumerated steps. For example, in some instances one or more aspects of methods 1000 and/or 1200, formats 500, 530, 600, and 630, and/or PDSCH message payload structure from FIG. 7 may be implemented as part of method 800. Further, in some embodiments, one or more of the enumerated steps may be omitted or performed in a different order.

At block 802, a UE 115 receives system information from BS 105. As noted at action 202 of FIG. 2, a system information message may include various configuration parameters for the subsequent determination of PUCCH resources at the UE 115. For example, the system information message may include default PUCCH resource configuration information including a default resource indicator, as well as bit length size for a resource indicator signaled via PDCCH DCI, and/or identification of RACH message parameter(s) to use when determining a resource indicator. The system information message may also include one or more look-up tables, or updates to look-up tables stored at the UE 115.

At block 804, the UE 115 obtains RACH configuration information (e.g., time domain allocations for RACH signaling, RACH preambles as allocation in the frequency domain, etc.) from the system information received at block 802. Further, the UE 115 obtains the default PUCCH resource configuration information discussed at block 802.

At block 806, the UE 115 transmits a RACH message (e.g., msgA) to the BS 105 as part of a RACH procedure, based on the pre-configured resources signaled via the system information discussed above at blocks 802 and 804.

At block 808, the UE 115 receives a RACH response message (e.g., msgB) from the BS 105 in response to the msgA sent at block 806. According to embodiments of the present disclosure, the UE 115 attempts to decode the PDCCH and the PDSCH of the msgB to obtain PUCCH resource configuration information for use in HARQ messaging.

The UE 115 first attempts to decode the PDCCH of msgB. At decision block 810, if the UE 115 is unable to decode the PDCCH of msgB, the method 800 proceeds to block 812.

At block 812, the UE 115 transmits a HARQ message (e.g., a NACK) to the BS 105 based on the default PUCCH resource configuration information obtained at block 804. As an example, the NACK would indicate that the UE 115 failed to properly receive the msgB from the BS 105. This provides the BS 105 with another opportunity to repeat transmission of msgB to the UE 115, in which case the method 800 would begin again at either block 802 or 806 (depending on whether system information is transmitted again in the interim).

For example, the UE 115 may use the default PUCCH resource configuration information when the other sources of PUCCH resource configuration information, such as in a DCI (in PDCCH) or PDSCH, are not available due to decoding failure. Here, since at decision block 810 the UE 115 was determined to be unable to decode PDCCH, it follows that the UE 115 is unable to decode PDSCH (since it is necessary to decode PDCCH in order to decode PDSCH). The default PUCCH resource configuration information may include, for example, a default resource indicator that serves as an index into a look-up table (such as either look-up table 500 or 530 from FIGS. 5A and 5B, respectively). The look-up table may provide a PUCCH resource set (i.e., configuration parameters from a given row) necessary for the PUCCH resource configuration for a HARQ transmission (whether ACK or NACK).

In addition to indexing into the look-up tables based on the default PUCCH resource configuration information obtained via the system information, the UE 115 may further configure one or more transmission parameters from their default values in the obtained PUCCH resource set from the look-up table. For example, the initial cyclic shift index may be configured according to one or more parameters the UE 115 used when transmitting its msgA at block 806. For example, the parameter from msgA may be a resource index like the preamble sequence index when combined with the cyclic shift identified from the look-up table entry. For example, the initial cyclic shift index may be obtained by equation 1:

$$\text{initial cyclic shift index} = (\text{PUCCH resource set index} + \text{preamble sequence index}) \bmod (\text{Number of cyclic shifts}), \quad (1)$$

where the "preamble sequence index" is obtained from the msgA transmission the UE 115 made. Thus, most of the PUCCH parameters are obtained from the look-up table, while the cyclic shift may be determined based on a parameter msgA that the UE sends at the start of the RACH procedure. This provides a default choice for the UE 115 to use for HARQ messaging when the UE 115 is unable to decode msgB PDCCH/PDSCH received at block 808. According to some embodiments of the present disclosure, using configuration information from PDSCH and/or PDCCH is prioritized over using such default configuration information.

Returning to decision block 810, if the UE 115 is able to decode the PDCCH of msgB, the method 800 instead proceeds to block 814.

At block 814, the UE 115 decodes the PDCCH (e.g., including descrambling the PDCCH's CRC using msgB-RNTI) and obtains thereby the DCI in the PDCCH. First, as discussed with respect to previous figures, when obtaining PUCCH resource configuration information from PDCCH the UE 115 may further rely upon additional information signaled in the system information messaging received at block 802. The system information message may include a bit length indicator N that identifies what the size (in bits) a resource indicator will be that is included in a msgB's DCI (in PDCCH). For example, the bit length indicator N may identify whether the length of the resource indicator in the DCI is 3 bits (such as is used for reduced size look-up tables such as table 530 of FIG. 5B) or 4 bits (such as is used for a full-sized look-up table such as table 500 of FIG. 5A). Embodiments of the present disclosure are also applicable to other N values besides these examples.

In further embodiments, the system information may also include an identification for the UE 115 to add a resource offset to the configuration information obtained from a look-up table, such as look-up table 500. For example, the system information message may identify a configuration parameter, or a combination of configuration parameters, that will be used in a subsequent RACH procedure for either msgA or msgB involving the UE 115. Some example configuration parameters include the msgA preamble sequence identifier, msgA preamble occasion index, msgA PUSCH occasion, msgB-RNTI, CORESET/search space index for msgB PDCCH, etc., or some combination of parameters as identified by the system information message. The configuration parameters may constitute Q bits of information, where "Q" is a variable for ease of reference herein. Such configuration parameters may be used in combination with a resource indicator to add a resource offset to the PUCCH resources. As a result, a look-up table larger than existing tables (e.g., with more than 16 entries) may not be necessary, as the resource offset provides further modification to the existing entries to provide the additional resource scheduling options for the UE 115.

After decoding the PDCCH, the UE 115 attempts to decode the PDSCH of msgB using information from the PDCCH. At decision block 816, if the UE 115 is unable to decode the PDSCH of msgB, the method 800 proceeds to block 818.

At block 818, the UE 115 transmits a HARQ message (e.g., a NACK upon failure to decode PDSCH) using the PUCCH configuration information obtained from the PDCCH as discussed at block 814. This provides the BS 105 another opportunity to repeat transmission of msgB to the UE 115, in which case the method 800 would begin again at either block 802 or 806 (depending on whether system information is transmitted again in the interim).

For example, transmitting the HARQ message may rely upon the PUCCH configuration information obtained via the DCI resource indicator (and, additionally in some embodiments, the Q-bit information for resource offset where signaled to use such in system information).

Returning to decision block 816, if the UE 115 is able to decode the PDSCH of msgB, the method 800 instead proceeds to block 820 (i.e., instead of transmitting without PUCCH configuration information from the PDSCH of msgB).

At block 820, the UE 115 decodes the PDSCH and obtains the PUCCH configuration information transmitted in a PDSCH payload. The PUCCH resource indicator may be transmitted in a unicast payload or a multicast payload, such as those illustrated in FIG. 7. The PUCCH resource indication may include a dynamic PUCCH resource configuration, including dynamically selected parameters such as starting location of physical resource blocks (PRB) or PRB offset in the frequency domain, intra-slot frequency hopping, second hop PRB offset, first symbol, number of symbols, initial indices for cyclic shift, number of PRBs, time domain orthogonal cover code (OCC), OCC length, OCC index, inter-slot frequency hopping, additional demodulation reference signal (DMRS) configuration, maximum code rate, number slots, support for $\pi/2$ binary phase shift keying (BPSK), and/or support for simultaneous HARQ ACK and CSI, some subset or combination of these, etc. Alternatively, the PUCCH resource indication may be a hard-coded configuration such as in the look-up table examples of FIGS. 5A-5B.

According to some embodiments of the present disclosure, using configuration information from PDSCH is prioritized over using configuration information from PDCCH, which is in turn prioritized over using default configuration information based on the system information.

At block 822, the UE 115 transmits a HARQ message (e.g., an ACK or NACK) using the PUCCH configuration information obtained at block 820.

Figure 9:
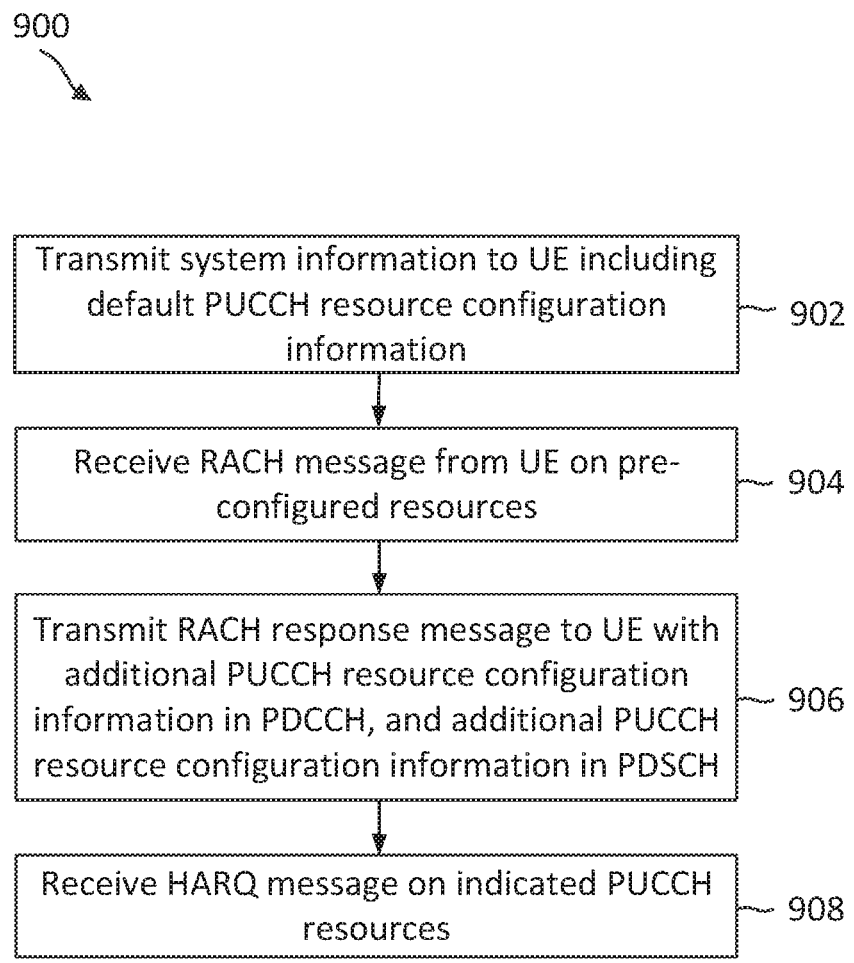
FIG. 9 illustrates a flow diagram of a wireless communication method according to some embodiments of the present disclosure.

FIG. 9 illustrates a flow diagram of a wireless communication method 900 for the tiered approach according to some embodiments of the present disclosure. Aspects of the method 900 can be executed by a wireless communication device, such as the BSs 105 and/or 400 utilizing one or more components, such as the processor 402, the memory 404, the RACH communication and processing module 408, the transceiver 410, the modem 412, the one or more antennas 416, and various combinations thereof. As illustrated, the method 900 includes a number of enumerated steps, but embodiments of the method 900 may include additional steps before, after, and in between the enumerated steps. For example, in some instances one or more aspects of methods 1100 and/or 1300, formats 500, 530, 600, and 630, and/or PDSCH message payload structure from FIG. 7 may be implemented as part of method 900. In some embodiments, one or more of the enumerated steps may be omitted or performed in a different order.

At block 902, the BS 105 transmits system information to a UE 115 (e.g., broadcast to multiple UEs 115, but described with respect to a single UE 115 for sake of simplicity of discussion here). As discussed at block 802 of FIG. 8, the system configuration may include various types of information. For example, the BS 105 may include specific types of information such as default PUCCH configuration information, as well as a value for N, and/or Q, and/or a configuration parameter to use from msgA or msgB, etc., depending upon a determination of what way(s) in which the BS 105 will transmit PUCCH configuration information to the UE 115.

At block 904, the BS 105 receives a RACH message (e.g., msgA) from the UE 115 on pre-configured resources signaled via the system information at block 902.

At block 906, the BS 105 transmits a RACH response message (e.g., msgB) to the UE 115 in response to the msgA received at block 904. The RACH response message includes PDCCH and PDSCH components. According to embodiments of the present disclosure, the BS 105 includes PUCCH resource indicator information in both PUCCH (via DCI) and PDSCH. For example, the BS 105 may encode PUCCH resource indicator information into a DCI format (e.g., FIG. 6A or 6B) depending upon the look-up table size signaled by the N value (and also Q where the number of configurations for PUCCH resources is greater than the DCI field size) in the prior system information sent at block 902. This will be used to index into the look-up table (e.g., FIG. 5A or 5B) to obtain PUCCH configuration information. Further, the BS 105 may also encode PUCCH configuration information (or just PUCCH resource indicator where the information is hard-coded) into a PDSCH payload, such as that illustrated in FIG. 7 (whether unicast or multicast).

At block 908, after the UE 115 successfully obtained PUCCH configuration information (whether default configuration information, signaled via PDCCH, and/or PDSCH), the BS 105 receives a HARQ message on appropriately indicated PUCCH resources, in response to which the BS 105 either repeats msgB or continues with the connection process.

Figure 10:
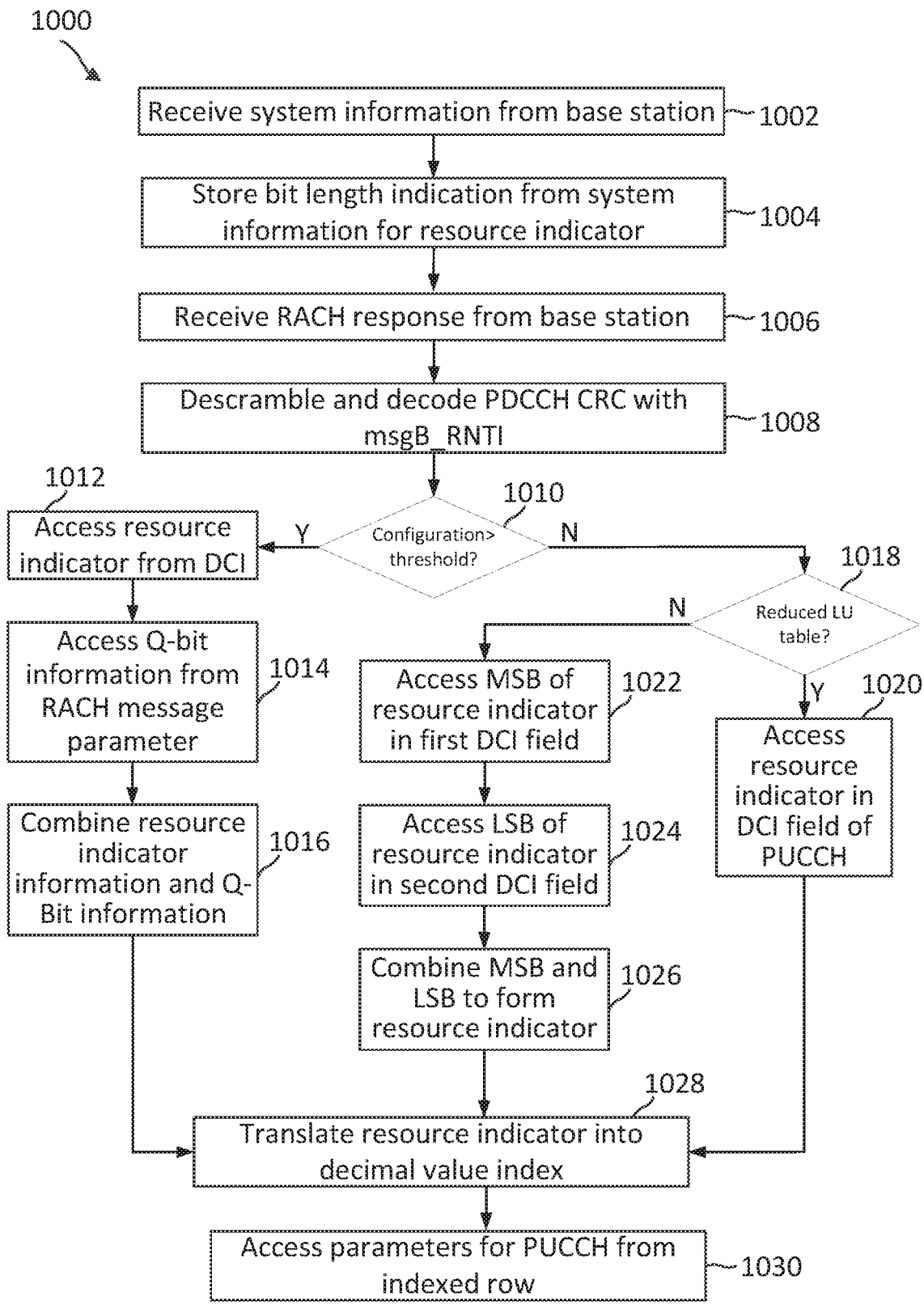
FIG. 10 illustrates a flow diagram of a wireless communication method according to some embodiments of the present disclosure.

FIG. 10 illustrates a flow diagram of a wireless communication method 1000 that implements a PDCCH signaling approach using DCI according to some embodiments of the present disclosure. Aspects of the method 1000 can be executed by a wireless communication device, such as the UEs 115 and/or 300 utilizing one or more components, such as the processor 302, the memory 304, the RACH communication and processing module 308, the transceiver 310, the modem 312, the one or more antennas 316, and various combinations thereof. As illustrated, the method 1000 includes a number of enumerated steps, but embodiments of the method 1000 may include additional steps before, during, after, and in between the enumerated steps. For example, in some instances one or more aspects of methods 800 and/or 1200, formats 500, 530, 600, and 630, and/or PDSCH message payload structure from FIG. 7 may be implemented as part of method 1000. Further, in some embodiments, one or more of the enumerated steps may be omitted or performed in a different order.

At block 1002, the UE 115 receives system information from the BS 105, such as discussed above with respect to block 802 of FIG. 8. In particular, according to the embodiments of FIG. 10, the system information includes a bit length size (N value) for a resource indicator signaled via PDCCH DCI, and in some embodiments also a Q value where the number of configurations for PUCCH resources is greater than the DCI field size. The system information may also include one or more look-up tables, or updates thereto.

At block 1004, the UE 115 stores the bit length indication N from the system information received at block 1002 for subsequent use in locating a resource indicator in a DCI of a msgB. Where Q is signaled, and/or other information relevant to obtaining the PUCCH configuration information for transmitting a HARQ message, the UE 115 may obtain and store those values for use in a RACH procedure as well.

At block 1006, the UE 115 receives a RACH response message (e.g., msgB) from the BS 105 in response to a RACH message (msgA) sent from the UE 115 to the BS 105. The RACH response message may include PDCCH and PDSCH components.

At block 1008, the UE 115 descrambles and decodes the PDCCH starting with the CRC. The UE 115 uses msgB-RNTI to perform the descrambling of the CRC.

At decision block 1010, if the number of configurations for PUCCH resources is greater than the DCI field size, the method 1000 proceeds to block 1012.

At block 1012, the UE 115 accesses the resource indicator from the DCI (e.g., from a modified or new DCI format, such as illustrated in FIG. 6B) that provides a larger resource indicator, e.g. a 4-bit resource indicator.

At block 1014, the UE 115 accesses the information relating to a Q value (e.g., which message parameter will be used) stored at block 1004 and determines the Q-bit values. For example, where the system information indicated that a parameter of msgA will provide the Q-bit values, the UE 115 will access that information (e.g., msgA preamble sequence identifier, msgA preamble occasion index, msgA PUSCH occasion, etc.). As another example, where msgB is indicated as providing the Q-bit values, the UE 115 will access that information (e.g., msgB-RNTI, CORESET/search space index for msgB PDCCH, etc.).

At block 1016, the UE 115 combines the resource indicator from block 1012 with the Q-bit values from block 1014, which will be converted together from a binary form to a decimal form in order to index into a look-up table with an index value.

Returning now to decision block 1010, if the number of configurations for PUCCH resources is not greater than the DCI field size, then the method 1000 proceeds to decision block 1018 instead.

At decision block 1018, if the system information identified the look-up table to be a reduced look-up table such as table 530 from the example of FIG. 5B (e.g., as indicated by the bit length indicator N), the method 1000 proceeds to block 1020.

At block 1020, the UE 115 accesses the resource indicator in the PUCCH DCI field. In this example, with the reduced look-up table, the system information the UE 115 received at block 1002 would have signaled a smaller N-value, such as 3 bits, for the UE 115 to recognize the 3-bit resource indicator in the appropriate field of the DCI upon receipt of the PDCCH for msgB.

Returning to decision block 1018, if the system information identified the look-up table to be a larger look-up table such as table 500 from the example of FIG. 5A (e.g., as indicated by the bit length indicator N), the method 1000 instead proceeds to block 1022.

At block 1022, the UE 115 accesses the MSB of the resource indicator in the appropriate field of a modified DCI (also referred to as a first field herein). This may be, for example, the repurposed/split HARQ Number field at row 632 that now repurposed one bit for the MSB field.

At block 1024, the UE 115 accesses the LSB of the resource indicator in the appropriate field of the modified DCI (also referred to as a second field herein). This may be, for example, the repurposed PUCCH Resource Indicator field at row 638 now repurposed as the LSB for PUCCH Resource Indicator field.

At block 1026, the UE 115 combines the MSB and LSB bits together to form the PUCCH resource indicator that will be used to index into a look-up table. In some embodiments, instead of repurposing an existing DCI format that splits the resource indicator into MSB and LSB fields, the BS 105 may signal a new DCI format to the UE 115 that has fields specifically purposed for communication according to embodiments of the present disclosure (e.g., one PUCCH resource indicator field with a 4-bit length, etc.).

From any of blocks 1016, 1020, and 1026, the method 1000 proceeds to block 1028.

At block 1028, the UE 115 translates the resource indicator (determined from blocks 1016, 1020, or 1026) into a decimal format in order to be able to index into the look-up table (e.g., from binary to decimal in some examples). For example, with the resource indicator from either block 1020 or 1026, conversion may take the form of equation 2:

$$r_{PUCCH} = \Sigma_{n=0}^{N-1} b_{PUCCH,DCI}(n) \times 2^n, \quad (2)$$

where $b_{PUCCH,DCI}(n)$ denotes the $n^{th}$ bit of the PUCCH resource indicator in the DCI.

As another example, with the resource indicator from block 1016 (including the Q-bit information), conversion may take the form of equation 3:

$$r_{PUCCH} = \Sigma_{n=0}^{N-1} b_{PUCCH,DCI}(n) \times 2^n + \Sigma_{q=0}^{Q-1} b_{config}(q) \times 2^{q+N}, \quad (3)$$

where $b_{config}(q)$ denotes the qth bit of the two step RACH configuration parameters (e.g., from msgA or msgB).

In some examples, $b_{config}(q)$ may be a function of the time, frequency, and/or code domain resource index configured for msgA or msgB transmission (or some other parameter as discussed above). An example of $b_{config}(q)$ derivation is in equation 4:

$$b_{config}(q) = \mod(X, 2^q, q=0,1, \ldots, Q-1, \quad (4)$$

where X may be the msgA preamble sequence ID, msgA preamble/PUSCH occasion index, msgB-RNTI, etc.

After translating the resource indicator to a decimal format, the method 1000 proceeds to block 1030. At block 1030, the UE 115 accesses the configuration parameters for the PUCCH from the row of the look-up table into which the translated resource indicator indexes. From this information, the method 1000 may proceed with the UE 115 transmitting a HARQ message such as discussed above with respect to block 818 above (e.g., where PDSCH is not decoded to obtain the PUCCH configuration information from the PDSCH payload).

Figure 11:
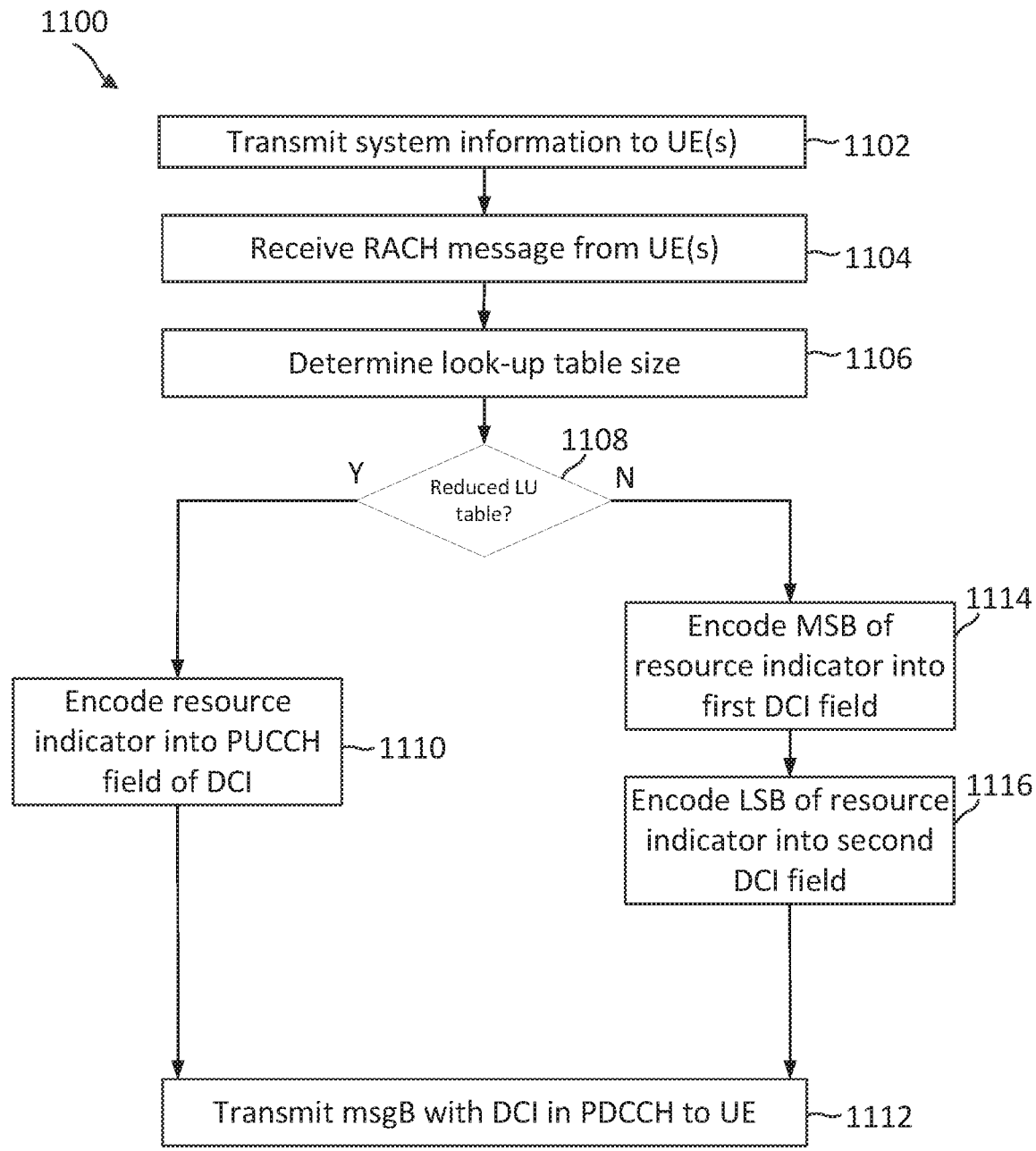
FIG. 11 illustrates a flow diagram of a wireless communication method according to some embodiments of the present disclosure.

FIG. 11 illustrates a flow diagram of a wireless communication method 1100 that implements a PDCCH signaling approach using DCI according to some embodiments of the present disclosure. Aspects of the method 1100 can be executed by a wireless communication device, such as the BSs 105 and/or 400 utilizing one or more components, such as the processor 402, the memory 404, the RACH communication and processing module 408, the transceiver 410, the modem 412, the one or more antennas 416, and various combinations thereof. As illustrated, the method 1100 includes a number of enumerated steps, but embodiments of the method 1100 may include additional steps before, after, and in between the enumerated steps. For example, in some instances one or more aspects of methods 900 and/or 1300, formats 500, 530, 600, and 630, and/or PDSCH message payload structure from FIG. 7 may be implemented as part of method 1100. In some embodiments, one or more of the enumerated steps may be omitted or performed in a different order.

At block 1102, the BS 105 transmits system information to one or more UEs 115, such as discussed above with respect to block 902. In particular, according to the embodiments of FIG. 11, the system information includes a bit length size (N value) for a resource indicator signaled via PDCCH DCI, and in some embodiments also a Q value where the number of configurations for PUCCH resources is greater than the DCI field size. The system information may also include one or more look-up tables, or updates thereto.

At block 1104, the BS 105 receives a RACH message (e.g., msgA) from a UE (referring to one UE for sake of illustration), such as discussed above with respect to block 904.

At block 1106, the BS 105 determines a size of the look-up table (e.g., 500 or 530 in some examples), following the indication sent at block 1102 (including the N value identifying which size of look-up table is in use).

At decision block 1108, if the look-up table is a reduced-size look-up table, such as table 530 of FIG. 5B, the method 1100 proceeds to block 1110.

At block 1110, the BS 105 encodes the resource indicator, having a shorter bit length as signaled in the system information at block 1102, into a DCI for a PDCCH portion of the msgB transmission.

Returning to decision block 1108, if the look-up table is not a reduced-size look-up table (such as table 500 of FIG. 5A), the method 1100 proceeds to block 1114.

At block 1114, the BS 105 encodes the MSB of the resource indicator, having an overall longer bit length (e.g., four bits), into a first field of the DCI.

At block 1116, the BS 105 encodes the LSB of the resource indicator (i.e., the remaining bits thereof), into a second field of the DCI. While discussed as separate aspects, in some embodiments, instead of repurposing an existing DCI format that splits the resource indicator into MSB and LSB fields, the BS 105 may signal a new DCI format to the UE 115 that has fields specifically purposed for communication according to embodiments of the present disclosure (e.g., one PUCCH resource indicator field with a 4-bit length, etc.). In such a case, encoding from blocks 1114 and 1116 would involve encoding to one overall field.

From either blocks 1110 or 1116, the method 1100 proceeds to block 1112. At block 1112, the BS 105 transmits the RACH response message (msgB) with the DCI including encoded resource indicator in the PDCCH to the UE 115. The UE 115 will proceed to use this information for determining PUCCH resources to use in sending the HARQ message, as discussed above.

Figure 12:
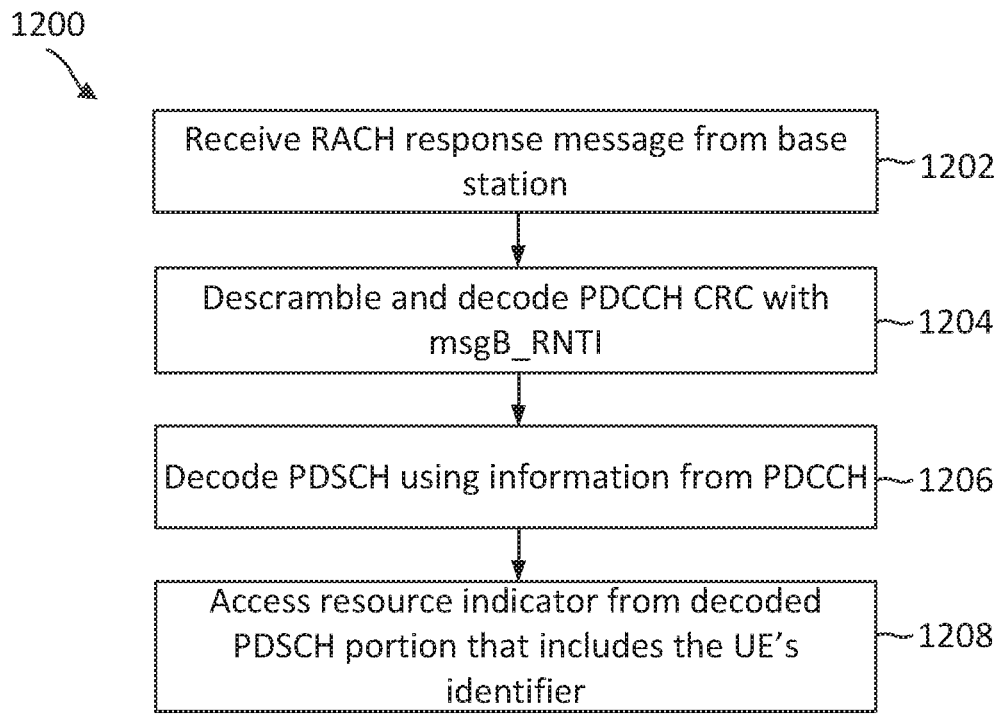
FIG. 12 illustrates a flow diagram of a wireless communication method according to some embodiments of the present disclosure.

FIG. 12 illustrates a flow diagram of a wireless communication method 1200 that implements a PDCCH signaling approach using PDSCH payload according to some embodiments of the present disclosure. Aspects of the method 1200 can be executed by a wireless communication device, such as the UEs 115 and/or 300 utilizing one or more components, such as the processor 302, the memory 304, the RACH communication and processing module 308, the transceiver 310, the modem 312, the one or more antennas 316, and various combinations thereof. As illustrated, the method 1200 includes a number of enumerated steps, but embodiments of the method 1200 may include additional steps before, during, after, and in between the enumerated steps. For example, in some instances one or more aspects of methods 800 and/or 1000, formats 500, 530, 600, and 630, and/or PDSCH message payload structure from FIG. 7 may be implemented as part of method 1200. Further, in some embodiments, one or more of the enumerated steps may be omitted or performed in a different order.

At block 1202, the UE 115 receives a RACH response message (e.g., msgB) from the BS 105 in response to the UE 115 previously sending a RACH message (e.g., msgA) to the BS 105.

At block 1204, the UE 115 descrambles and decodes the PDCCH starting with the CRC. The UE 115 uses msgB-RNTI to perform the descrambling of the CRC.

At block 1206, upon successfully decoding the PDCCH, the UE 115 decodes the PDSCH using information from the PDCCH.

At block 1208, the UE 115 accesses the resource indicator from the decoded PDSCH portion that includes the UE's identifier. For example, referring to FIG. 7's PDSCH message payload structure (either unicast or multicast), the UE 115 accesses the payload structure and locates the PUCCH resource indication and any other parameters for the PUCCH associated with the UE's payload portion. This may be identified, for example, by the UE 115's contention resolution ID and/or C-RNTI included in the payload as well. From this information, the method 1200 may proceed with the UE 115 transmitting a HARQ message such as discussed above with respect to block 822 above (e.g., where PDSCH is decoded to obtain the PUCCH configuration information from the PDSCH payload).

Figure 13:
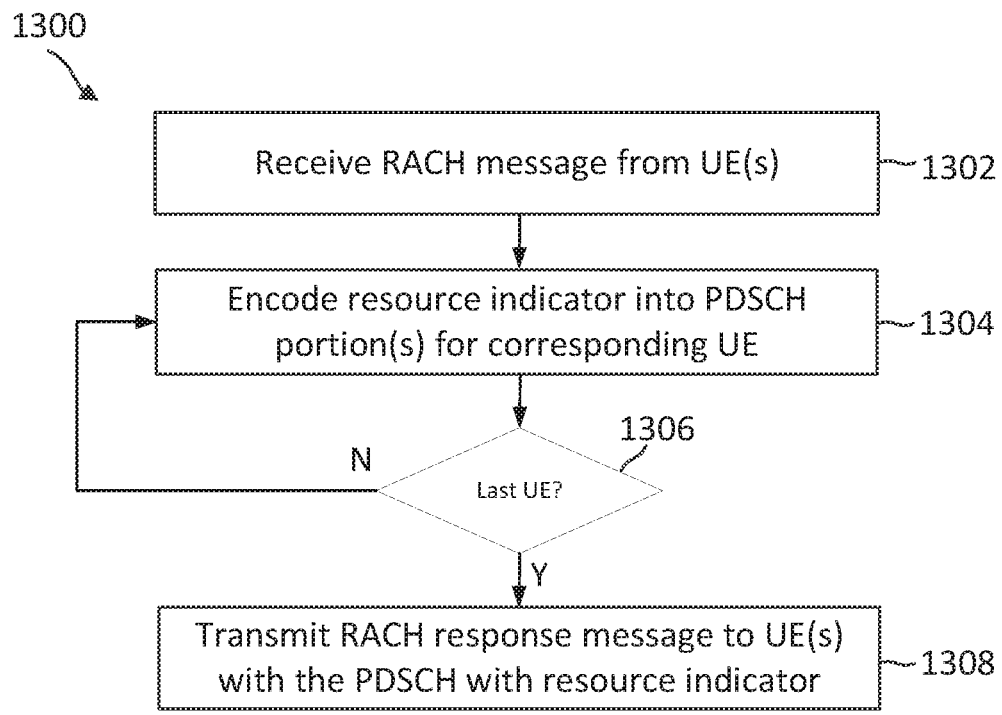
FIG. 13 illustrates a flow diagram of a wireless communication method according to some embodiments of the present disclosure.

FIG. 13 illustrates a flow diagram of a wireless communication method 1300 that implements a PDCCH signaling approach using PDSCH payload according to some embodiments of the present disclosure. Aspects of the method 1300 can be executed by a wireless communication device, such as the BSs 105 and/or 400 utilizing one or more components, such as the processor 402, the memory 404, the RACH communication and processing module 408, the transceiver 410, the modem 412, the one or more antennas 416, and various combinations thereof. As illustrated, the method 1300 includes a number of enumerated steps, but embodiments of the method 1300 may include additional steps before, after, and in between the enumerated steps. For example, in some instances one or more aspects of methods 900 and/or 1100, formats 500, 530, 600, and 630, and/or PDSCH message payload structure from FIG. 7 may be implemented as part of method 1300. In some embodiments, one or more of the enumerated steps may be omitted or performed in a different order.

At block 1302, the BS 105 receives a RACH message (e.g., msgA) from a UE, such as discussed above with respect to block 904.

At block 1304, the BS 105 encodes the PUCCH configuration information (e.g., either the dynamically configured by RRC or hard coded with look-up table) into a PDSCH payload, such as illustrated in FIG. 7 (for either unicast or multicast).

At decision block 1306, if there are other UEs which are part of the same RACH occasion, the method 1300 may return to block 1304 in order to encode PUCCH configuration information into a multicast payload in PDSCH.

If instead at decision block 1306 there are no further UEs part of the same RACH occasion which have transmitted a msgA to the BS 105, the method 1300 proceeds to block 1308.

At block 1308, the BS 105 transmits a RACH response message (msgB) to the UE(s) that had sent a msgA with respect to block 1302. The msgB includes a PDSCH that has the resource indicator/configuration information encoded into the PDSCH payload, which the UE will attempt to decode in order to use for a HARQ message.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method for wireless communication comprising receiving, by a user equipment (UE) from a base station (BS), a system information message or radio resource control (RRC) signaling; transmitting, by the UE to the BS, a random access channel (RACH) message as part of a two-step RACH procedure; receiving, by the UE from the BS, a RACH response message as part of the two-step RACH procedure; determining, by the UE, physical uplink control channel (PUCCH) resources to use for a hybrid automatic repeat request (HARQ) procedure based on at least one of a system information parameter and a parameter from the two-step RACH procedure; and transmitting, by the UE to the BS, a HARQ message using the PUCCH resources.

The method may also include wherein the determining further comprises attempting, by the UE, to decode a physical downlink control channel (PDCCH) of the RACH response message. The method may also include accessing, by the UE in response to failing to decode the PDCCH, a PUCCH resource set in a row in a look-up table based on information obtained from the system information message; configuring, by the UE, a cyclic shift index based on a resource index of the RACH message; and applying, by the UE, the cyclic shift index to the PUCCH resource set to result in the PUCCH resources. The method may also include wherein the determining further comprises attempting, by the UE, to decode a physical downlink shared channel (PDSCH) of the RACH response message in response to successfully decoding the PDCCH; and determining, by the UE, a resource configuration field length from the system information message, the resource configuration field length identifying whether downlink control information (DCI) of the PDCCH will indicate a resource lookup into a look-up table with a first size or a second size using a resource indicator, the second size being greater than the first size. The method may also include obtaining, by the UE based on the resource configuration field length, the resource indicator from the DCI for the resource lookup into the look-up table with the first size; and accessing, by the UE, the PUCCH resources in the look-up table based on the resource indicator, wherein the resource configuration field length comprises three bits, and the DCI comprises DCI format 1_0. The method may also include accessing, by the UE, a first part of the resource indicator in a first field of the DCI; accessing, by the UE, a second part of the resource indicator in a second field of the DCI following the first field; and combining, by the UE, the first part and the second part to form the resource indicator for the resource lookup into the look-up table with the second size. The method may also include accessing, by the UE, the PUCCH resources in the look-up table based on the resource indicator, wherein the resource configuration field length comprises four bits, and the DCI is based on a modification to DCI format 1_0. The method may also include deriving, by the UE, the resource indicator from a combination of information from the DCI and a configuration parameter of the RACH message from the UE used in the two-step RACH procedure; and adding, by the UE, a resource offset to a physical resource block offset identified in the look-up table based on the derived resource indicator. The method may also include wherein the configuration parameter is a function of a domain resource index configured for a message used in the two-step RACH procedure. The method may also include obtaining, by the UE, the PUCCH resources from the PDSCH in response to successfully decoding the PDSCH. The method may also include wherein the PUCCH resources include dynamically selected configuration parameters. The method may also include wherein the RACH response message comprises a multicast message. The method may also include wherein the RACH response message comprises a unicast message. The method may also include wherein the look-up table with the second size comprises a number of entries, and the look-up table with the first size comprises a reduced number of entries. The method may also include wherein the reduced number of entries comprises a subset of the number of entries.

Further embodiments of the present disclosure include a user equipment, comprising a transceiver configured to: receive, from a base station (BS), a system information message or radio resource control (RRC) signaling; transmit, to the BS, a random access channel (RACH) message as part of a two-step RACH procedure; and receive, from the BS, a RACH response message as part of the two-step RACH procedure; and a processor configured to: determine physical uplink control channel (PUCCH) resources to use for a hybrid automatic repeat request (HARQ) procedure based on at least one of a system information parameter and a parameter from the two-step RACH procedure; wherein the transceiver is further configured to transmit, to the BS, a HARQ message using the PUCCH resources.

The user equipment may also include wherein the processor is further configured to attempt to decode a physical downlink control channel (PDCCH) of the RACH response message. The user equipment may also include wherein the processor is further configured to access, in response to failing to decode the PDCCH, a PUCCH resource set in a row in a look-up table based on information obtained from the system information message; configure a cyclic shift index based on a resource index of the RACH message; and apply the cyclic shift index to the PUCCH resource set to result in the PUCCH resources. The user equipment may also include wherein the processor is further configured to attempt to decode a physical downlink shared channel (PDSCH) of the RACH response message in response to successfully decoding the PDCCH; and determine a resource configuration field length from the system information message, the resource configuration field length identifying whether downlink control information (DCI) of the PDCCH will indicate a resource lookup into a look-up table with a first size or a second size using a resource indicator, the second size being greater than the first size. The user equipment may also include wherein the processor is further configured to obtain, based on the resource configuration field length, the resource indicator from the DCI for the resource lookup into the look-up table with the first size; and access the PUCCH resources in the look-up table based on the resource indicator, wherein the resource configuration field length comprises three bits, and the DCI comprises DCI format 1_0. The user equipment may also include wherein the processor is further configured to: access a first part of the resource indicator in a first field of the DCI; access a second part of the resource indicator in a second field of the DCI following the first field; and combine the first part and the second part to form the resource indicator for the resource lookup into the look-up table with the second size. The user equipment may also include wherein the processor is further configured to access the PUCCH resources in the look-up table based on the resource indicator, wherein the resource configuration field length comprises four bits, and the DCI is based on a modification to DCI format 1_0. The user equipment may also include wherein the processor is further configured to derive the resource indicator from a combination of information from the DCI and a configuration parameter of the RACH message from the UE used in the two-step RACH procedure; and add a resource offset to a physical resource block offset identified in the look-up table based on the derived resource indicator. The user equipment may also include wherein the configuration parameter is a function of a domain resource index configured for a message used in the two-step RACH procedure. The user equipment may also include wherein the processor is further configured to obtain the PUCCH resources from the PDSCH in response to successfully decoding the PDSCH. The user equipment may also include wherein the PUCCH resources include dynamically selected configuration parameters. The user equipment may also include wherein the RACH response message comprises a multicast message. The user equipment may also include wherein the RACH response message comprises a unicast message. The user equipment may also include wherein the look-up table with the second size comprises a number of entries, and the look-up table with the first size comprises a reduced number of entries. The user equipment may also include wherein the reduced number of entries comprises a subset of the number of entries.

Further embodiments of the present disclosure include a non-transitory computer-readable medium having program code recorded thereon, the program code comprising code for causing a user equipment to receive, from a base station (BS), a system information message or radio resource control (RRC) signaling; code for causing the UE to transmit, to the BS, a random access channel (RACH) message as part of a two-step RACH procedure; code for causing the UE to receive, from the BS, a RACH response message as part of the two-step RACH procedure; code for causing the UE to determine physical uplink control channel (PUCCH) resources to use for a hybrid automatic repeat request (HARQ) procedure based on at least one of a system information parameter and a parameter from the two-step RACH procedure; and code for causing the UE to transmit, to the BS, a HARQ message using the PUCCH resources.

The non-transitory computer-readable medium may also include wherein the code for causing the determining further comprises code for causing the UE to attempt to decode a physical downlink control channel (PDCCH) of the RACH response message. The non-transitory computer-readable medium may also include wherein the code further comprises code for causing the UE to access, in response to failing to decode the PDCCH, a PUCCH resource set in a row in a look-up table based on information obtained from the system information message; code for causing the UE to configure a cyclic shift index based on a resource index of the RACH message; and code for causing the UE to apply the cyclic shift index to the PUCCH resource set to result in the PUCCH resources. The non-transitory computer-readable medium may also include wherein the code for causing the determining further comprises code for causing the UE to attempt to decode a physical downlink shared channel (PDSCH) of the RACH response message in response to successfully decoding the PDCCH; and code for causing the UE to determine a resource configuration field length from the system information message, the resource configuration field length identifying whether downlink control information (DCI) of the PDCCH will indicate a resource lookup into a look-up table with a first size or a second size using a resource indicator, the second size being greater than the first size. The non-transitory computer-readable medium may also include wherein the code further comprises code for causing the UE to obtain, based on the resource configuration field length, the resource indicator from the DCI for the resource lookup into the look-up table with the first size; and code for causing the UE to access the PUCCH resources in the look-up table based on the resource indicator, wherein the resource configuration field length comprises three bits, and the DCI comprises DCI format 1_0. The non-transitory computer-readable medium may also include wherein the code further comprises code for causing the UE to access a first part of the resource indicator in a first field of the DCI; code for causing the UE to access a second part of the resource indicator in a second field of the DCI following the first field; and code for causing the UE to combine the first part and the second part to form the resource indicator for the resource lookup into the look-up table with the second size. The non-transitory computer-readable medium may also include wherein the code further comprises code for causing the UE to access the PUCCH resources in the look-up table based on the resource indicator, wherein the resource configuration field length comprises four bits, and the DCI is based on a modification to DCI format 1_0. The non-transitory computer-readable medium may also include wherein the code further comprises code for causing the UE to derive the resource indicator from a combination of information from the DCI and a configuration parameter of the RACH message from the UE used in the two-step RACH procedure; and code for causing the UE to add a resource offset to a physical resource block offset identified in the look-up table based on the derived resource indicator. The non-transitory computer-readable medium may also include wherein the configuration parameter is a function of a domain resource index configured for a message used in the two-step RACH procedure. The non-transitory computer-readable medium may also include wherein the code further comprises code for causing the UE to obtain the PUCCH resources from the PDSCH in response to successfully decoding the PDSCH. The non-transitory computer-readable medium may also include wherein the PUCCH resources include dynamically selected configuration parameters. The non-transitory computer-readable medium may also include wherein the RACH response message comprises a multicast message. The non-transitory computer-readable medium may also include, wherein the RACH response message comprises a unicast message. The non-transitory computer-readable medium may also include wherein the look-up table with the second size comprises a number of entries, and the look-up table with the first size comprises a reduced number of entries. The non-transitory computer-readable medium may also include wherein the reduced number of entries comprises a subset of the number of entries.

Further embodiments of the present disclosure include a non-transitory computer-readable medium having program code recorded thereon, the program code comprising code for causing a user equipment (UE) to receive, from a base station (BS), a random access channel (RACH) response message as part of a two-step RACH procedure; code for causing the UE to decode, based on a bit length indicator for a resource indicator, a physical downlink control channel (PDCCH) of the RACH response message to obtain downlink control information (DCI) of the PDCCH, the resource indicator being based on the DCI; code for causing the UE to determine physical uplink control channel (PUCCH) resources to use for a hybrid automatic repeat request (HARQ) procedure from accessing a look-up table based on the resource indicator; and code for causing the UE to transmit, to the BS, a HARQ message using the PUCCH resources. The non-transitory computer-readable medium may also include wherein the code further comprises code for causing the UE to receive, from the BS prior to the RACH response message, a system information message that includes the bit length indicator, the bit length indicator identifying a bit length used to identify the PUCCH resource configuration field in the DCI. The non-transitory computer-readable medium may also include wherein the code for causing the decoding further comprises code for causing the UE to apply a message radio network temporary identifier (RNTI) to descramble and decode the PDCCH; and code for causing the UE to access the resource indicator in a PUCCH resource indicator field of the DCI, wherein the applying and accessing are based on the bit length indicator comprising a length of three bits, and the DCI comprises DCI format 1_0. The non-transitory computer-readable medium may also include wherein the code for causing the decoding further comprises. The non-transitory computer-readable medium may also include wherein the code for causing the decoding further comprises code for causing the UE to access a first part of the resource indicator in a first field of the DCI; code for causing the UE to access a second part of the resource indicator in a second field of the DCI following the first field with another field in between the first and second fields; and code for causing the UE to combine the first part and the second part to form the bit length indicator, wherein the accessing and combining are based on the bit length indicator comprising a length of four bits, the DCI being based on DCI format 1_0. The non-transitory computer-readable medium may also include wherein the look-up table comprises a first number of entries in response to the bit length indicator comprising four bits, and a second number of entries in response to the bit length indicator comprising three bits, the second number of entries comprising a subset of the first number of entries. The non-transitory computer-readable medium may also include wherein the code for causing the determining the PUCCH resources further comprises code for causing the UE to derive the resource indicator from a combination of the DCI and a configuration parameter used in the two-step RACH procedure. The non-transitory computer-readable medium may also include wherein the code further comprises code for causing the UE to transmit, to the BS, a RACH message prior to the RACH response message as part of the two-step RACH procedure, the configuration parameter being from the RACH message. The non-transitory computer-readable medium may also include wherein the configuration parameter is a function of a domain resource index configured for a message used in the two-step RACH procedure. The non-transitory computer-readable medium may also include wherein the code for causing the determining the PUCCH resources further comprises code for causing the UE to add a resource offset to a physical resource block offset identified in the look-up table based on the derived resource indicator.

Further embodiments of the present disclosure include a non-transitory computer-readable medium having program code recorded thereon, the program code comprising code for causing a user equipment (UE) to receive, from a base station (BS), a random access channel (RACH) response message as part of a two-step RACH procedure; code for causing the UE to decode a physical downlink shared channel (PDSCH) of the RACH response message to obtain a resource indicator; code for causing the UE to determine physical uplink control channel (PUCCH) resources to use for a hybrid automatic repeat request (HARQ) procedure based on the resource indicator from the PDSCH; and code for causing the UE to transmit, to the BS, a HARQ message using the PUCCH resources.

The non-transitory computer-readable medium may also include wherein the PUCCH resources determined from the PDSCH include dynamically selected configuration parameters. The non-transitory computer-readable medium may also include wherein the RACH message comprises a multicast message. The non-transitory computer-readable medium may also include wherein the RACH message comprises a unicast message. The non-transitory computer-readable medium may also include wherein the code for causing the determining the PUCCH resources further comprises. The non-transitory computer-readable medium may also include wherein the code for causing the determining the PUCCH resources further comprises accessing, by the UE, a look-up table based on the resource indicator.

Further embodiments of the present disclosure include a non-transitory computer-readable medium having program code recorded thereon, the program code comprising code for causing a base station (BS) to transmit, to a user equipment (UE), a system information message comprising default information to determine first physical uplink control channel (PUCCH) resources; code for causing the BS to receive, from the UE, a random access channel (RACH) message as part of a two-step RACH procedure; code for causing the BS to include a first resource indicator in downlink control information (DCI) in a physical downlink control channel (PDCCH) to determine second PUCCH resources, and a second resource indicator in a physical downlink shared channel (PDSCH) to determine third PUCCH resources; code for causing the BS to transmit, to the UE, the PDCCH and the PDSCH as a RACH response message; and code for causing the BS to receive, from the UE, a hybrid automatic repeat request (HARQ) message using at least one of the first PUCCH resources, the second PUCCH resources, and the third PUCCH resources.

The non-transitory computer-readable medium may also include wherein the receiving the HARQ message using the first PUCCH resources is in response to a failure in decoding the PDCCH. The non-transitory computer-readable medium may also include wherein the receiving the HARQ message using the second PUCCH resources is in response to a failure in decoding the PDSCH. The non-transitory computer-readable medium may also include wherein the receiving the HARQ message using the third PUCCH resources is in response to a success in decoding the PDCCH and the PDSCH. The non-transitory computer-readable medium may also include wherein the code for causing the including the first resource indicator further comprises code for causing the BS to include, in the system information message, a resource configuration field length for the DCI, the resource configuration field length identifying whether the DCI of the PDCCH will indicate a resource lookup into a look-up table with a first size or a second size using a resource indicator, the second size being greater than the first size. The non-transitory computer-readable medium may also include wherein the code further comprises code for causing the BS to set the resource configuration field length to three bits; and code for causing the BS to configure the DCI for inclusion in the PDCCH according to DCI format 1_0. The non-transitory computer-readable medium may also include wherein the code further comprises code for causing the BS to set the resource configuration field length to four bits; and code for causing the BS to configure the DCI for inclusion in the PDCCH according to a modified DCI format 1_0. The non-transitory computer-readable medium may also include wherein the code for causing the configuring further comprises code for causing the BS to split the resource indicator into a first part and a second part; code for causing the BS to add the first part in a first field of the DCI; and code for causing the BS to add the second part in a second field of the DCI following the first field. The non-transitory computer-readable medium may also include wherein the code further comprises code for causing the BS to include, in the system information message, an offset parameter that identifies a resource offset to be applied to resources identified from a look-up table. The non-transitory computer-readable medium may also include wherein the including the second resource indicator to determine the third PUCCH resources comprises dynamically selecting, by the BS configuration parameters for the third PUCCH resources. The non-transitory computer-readable medium may also include wherein the RACH response message comprises a multicast message. The non-transitory computer-readable medium may also include wherein the RACH response message comprises a unicast message. The non-transitory computer-readable medium may also include wherein the look-up table with the second size comprises a number of entries, and the look-up table with the first size comprises a reduced number of entries. The non-transitory computer-readable medium may also include wherein the reduced number of entries comprises a subset of the number of entries.

Further embodiments of the present disclosure include a user equipment, comprising means for receiving, from a base station (BS), a system information message or radio resource control (RRC) signaling; means for transmitting, to the BS, a random access channel (RACH) message as part of a two-step RACH procedure; means for receiving, from the BS, a RACH response message as part of the two-step RACH procedure; means for determining physical uplink control channel (PUCCH) resources to use for a hybrid automatic repeat request (HARQ) procedure based on at least one of a system information parameter and a parameter from the two-step RACH procedure; and means for transmitting, to the BS, a HARQ message using the PUCCH resources.

The user equipment may also include wherein the means for determining further comprises means for attempting, by the UE, to decode a physical downlink control channel (PDCCH) of the RACH response message. The user equipment may also include means for accessing, in response to failing to decode the PDCCH, a PUCCH resource set in a row in a look-up table based on information obtained from the system information message; means for configuring a cyclic shift index based on a resource index of the RACH message; and means for applying the cyclic shift index to the PUCCH resource set to result in the PUCCH resources. The user equipment may also include wherein the means for determining further comprises means for attempting to decode a physical downlink shared channel (PDSCH) of the RACH response message in response to successfully decoding the PDCCH; and means for determining a resource configuration field length from the system information message, the resource configuration field length identifying whether downlink control information (DCI) of the PDCCH will indicate a resource lookup into a look-up table with a first size or a second size using a resource indicator, the second size being greater than the first size. The user equipment may also include means for obtaining, based on the resource configuration field length, the resource indicator from the DCI for the resource lookup into the look-up table with the first size; and means for accessing the PUCCH resources in the look-up table based on the resource indicator, wherein the resource configuration field length comprises three bits, and the DCI comprises DCI format 1_0. The user equipment may also include means for accessing a first part of the resource indicator in a first field of the DCI; means for accessing means for a second part of the resource indicator in a second field of the DCI following the first field; and means for combining means for the first part and the second part to form the resource indicator for the resource lookup into the look-up table with the second size. The user equipment may also include means for accessing the PUCCH resources in the look-up table based on the resource indicator, wherein the resource configuration field length comprises four bits, and the DCI is based on a modification to DCI format 1_0. The user equipment may also include means for deriving the resource indicator from a combination of information from the DCI and a configuration parameter of the RACH message from the UE used in the two-step RACH procedure; and means for adding a resource offset to a physical resource block offset identified in the look-up table based on the derived resource indicator. The user equipment may also include wherein the configuration parameter is a function of a domain resource index configured for a message used in the two-step RACH procedure. The user equipment may also include means for obtaining the PUCCH resources from the PDSCH in response to successfully decoding the PDSCH. The user equipment may also include wherein the PUCCH resources include dynamically selected configuration parameters. The user equipment may also include wherein the RACH response message comprises a multicast message. The user equipment may also include wherein the RACH response message comprises a unicast message. The user equipment may also include wherein the look-up table with the second size comprises a number of entries, and the look-up table with the first size comprises a reduced number of entries. The user equipment may also include wherein the reduced number of entries comprises a subset of the number of entries.

Further embodiments of the present disclosure include a user equipment, comprising means for receiving, from a base station (BS), a random access channel (RACH) response message as part of a two-step RACH procedure; means for decoding, based on a bit length indicator for a resource indicator, a physical downlink control channel (PDCCH) of the RACH response message to obtain downlink control information (DCI) of the PDCCH, the resource indicator being based on the DCI; means for determining physical uplink control channel (PUCCH) resources to use for a hybrid automatic repeat request (HARQ) procedure from accessing a look-up table based on the resource indicator; and means for transmitting, to the BS, a HARQ message using the PUCCH resources.

The user equipment may also include means for receiving, from the BS prior to the RACH response message, a system information message that includes the bit length indicator, the bit length indicator identifying a bit length used to identify the PUCCH resource configuration field in the DCI. The user equipment may also include wherein the means for decoding further comprises means for applying a message radio network temporary identifier (RNTI) to descramble and decode the PDCCH; and means for accessing the resource indicator in a PUCCH resource indicator field of the DCI, wherein the applying and accessing are based on the bit length indicator comprising a length of three bits, and the DCI comprises DCI format 1_0. The user equipment may also include wherein the means for decoding further comprises means for accessing a first part of the resource indicator in a first field of the DCI; means for accessing a second part of the resource indicator in a second field of the DCI following the first field with another field in between the first and second fields; and means for combining the first part and the second part to form the bit length indicator, wherein the accessing and combining are based on the bit length indicator comprising a length of four bits, the DCI being based on DCI format 1_0. The user equipment may also include wherein the look-up table comprises a first number of entries in response to the bit length indicator comprising four bits, and a second number of entries in response to the bit length indicator comprising three bits, the second number of entries comprising a subset of the first number of entries. The user equipment may also include wherein the means for determining the PUCCH resources further comprises means for deriving the resource indicator from a combination of the DCI and a configuration parameter used in the two-step RACH procedure. The user equipment may also include means for transmitting, to the BS, a RACH message prior to the RACH response message as part of the two-step RACH procedure, the configuration parameter being from the RACH message. The user equipment may also include wherein the configuration parameter is a function of a domain resource index configured for a message used in the two-step RACH procedure. The user equipment may also include wherein the means for determining the PUCCH resources further comprises means for adding a resource offset to a physical resource block offset identified in the look-up table based on the derived resource indicator.

Further embodiments of the present disclosure include a user equipment, comprising means for receiving, from a base station (BS), a random access channel (RACH) response message as part of a two-step RACH procedure; means for decoding a physical downlink shared channel (PDSCH) of the RACH response message to obtain a resource indicator; means for determining physical uplink control channel (PUCCH) resources to use for a hybrid automatic repeat request (HARQ) procedure based on the resource indicator from the PDSCH; and means for transmitting, to the BS, a HARQ message using the PUCCH resources.

The user equipment may also include wherein the PUCCH resources determined from the PDSCH include dynamically selected configuration parameters. The user equipment may also include wherein the RACH message comprises a multicast message. The user equipment may also include wherein the RACH message comprises a unicast message. The user equipment may also include wherein the means for determining the PUCCH resources further comprises means for accessing a look-up table based on the resource indicator.

Further embodiments of the present disclosure include a base station, comprising means for transmitting, to a user equipment (UE), a system information message comprising default information to determine first physical uplink control channel (PUCCH) resources; means for receiving, from the UE, a random access channel (RACH) message as part of a two-step RACH procedure; means for including a first resource indicator in downlink control information (DCI) in a physical downlink control channel (PDCCH) to determine second PUCCH resources, and a second resource indicator in a physical downlink shared channel (PDSCH) to determine third PUCCH resources; means for transmitting, to the UE, the PDCCH and the PDSCH as a RACH response message; and means for receiving, from the UE, a hybrid automatic repeat request (HARQ) message using at least one of the first PUCCH resources, the second PUCCH resources, and the third PUCCH resources.

The base station may also include wherein the receiving the HARQ message using the first PUCCH resources is in response to a failure in decoding the PDCCH. The base station may also include wherein the receiving the HARQ message using the second PUCCH resources is in response to a failure in decoding the PDSCH. The base station may also include wherein the receiving the HARQ message using the third PUCCH resources is in response to a success in decoding the PDCCH and the PDSCH. The base station may also include wherein the means for including the first resource indicator further comprises means for including, in the system information message, a resource configuration field length for the DCI, the resource configuration field length identifying whether the DCI of the PDCCH will indicate a resource lookup into a look-up table with a first size or a second size using a resource indicator, the second size being greater than the first size, The base station may also include means for setting the resource configuration field length to three bits; and means for configuring the DCI for inclusion in the PDCCH according to DCI format 1_0. The base station may also include means for setting the resource configuration field length to four bits; and means for configuring the DCI for inclusion in the PDCCH according to a modified DCI format 1_0. The base station may also include wherein the means for configuring further comprises means for splitting the resource indicator into a first part and a second part; means for adding the first part in a first field of the DCI; and means for adding the second part in a second field of the DCI following the first field. The base station may also include means for including, in the system information message, an offset parameter that identifies a resource offset to be applied to resources identified from a look-up table. The base station may also include wherein the including the second resource indicator to determine the third PUCCH resources comprises dynamically selecting, by the BS configuration parameters for the third PUCCH resources. The base station may also include wherein the RACH response message comprises a multicast message. The base station may also include wherein the RACH response message comprises a unicast message. The base station may also include wherein the look-up table with the second size comprises a number of entries, and the look-up table with the first size comprises a reduced number of entries. The base station may also include wherein the reduced number of entries comprises a subset of the number of entries.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication comprising:
receiving, by a user equipment (UE) from a base station (BS), a random access channel (RACH) response message as part of a two-step RACH procedure;
decoding, by the UE in response to a radio resource control (RRC) connection state corresponding to a connected state, a physical downlink control channel (PDCCH) of the RACH response message to obtain a resource indicator based on a downlink control information (DCI) of the PDCCH;
decoding, by the UE in response to the RRC connection state corresponding to a non-connected state, a physical downlink shared channel (PDSCH) of the RACH response message to obtain the resource indicator of the PDSCH;
determining, by the UE, physical uplink control channel (PUCCH) resources to use for a hybrid automatic repeat request (HARQ) procedure based on the resource indicator; and
transmitting, by the UE to the BS, a HARQ message using the PUCCH resources.

2. The method of claim 1, wherein the DCI comprises DCI format 1_0.

3. The method of claim 1, wherein the decoding in response to the RRC connection state corresponding to a connected state further comprises:
accessing, by the UE, the resource indicator in a PUCCH resource indicator field of the DCI.

4. The method of claim 3, wherein the resource indicator comprises a length of four bits.

5. The method of claim 1, wherein the decoding in response to the RRC connection state corresponding to a connect state further comprises:
accessing, by the UE, a first part of the resource indicator in a first field of the DCI;
accessing, by the UE, a second part of the resource indicator in a second field of the DCI following the first field with another field in between the first and second fields; and
combining, by the UE, the first part and the second part to form the resource indicator.

6. The method of claim 1, further comprising:
decoding, by the UE prior to the transmitting, a physical downlink shared channel (PDSCH) of the RACH response message; and
determining, by the UE, a timing advance from the PDSCH of the RACH response message for the HARQ procedure.

7. The method of claim 1, wherein the PUCCH resources determined from the PDSCH include dynamically selected configuration parameters.

8. The method of claim 1, wherein the RACH message comprises a multicast message.

9. The method of claim 1, wherein the RACH message comprises a unicast message.

10. The method of claim 1, wherein the determining the PUCCH resources further comprises:
accessing, by the UE, a look-up table based on the resource indicator.

11. The method of claim 10, wherein the look-up table comprises a first number of entries in response to the resource indicator comprising a length of four bits, and a second number of entries in response to the resource indicator comprising a length of three bits, the second number of entries comprising a subset of the first number of entries.

12. The method of claim 1, wherein the decoding in response to the RRC connection state corresponding to a non-connected state further comprises:
applying, by the UE, a message B radio network temporary identifier (RNTI) to descramble and decode the PDSCH.

13. A method of wireless communication comprising:
receiving, by a base station (BS) from a user equipment (UE), a random access channel (RACH) message as part of a two-step RACH procedure;
including, by the BS, a resource indicator in downlink control information (DCI) in a physical downlink control channel (PDCCH) for use by the UE with a radio resource control (RRC) connection state corresponding to a connected state;
including, by the BS, the resource indicator in a physical downlink shared channel (PDSCH) for use by the UE with a RRC connection state corresponding to a non-connected state, the resource indicator related to physical uplink control channel (PUCCH) resources;
transmitting, by the BS to the UE, the PDCCH and the PDSCH as part of a RACH response message; and
receiving, by the BS from the UE, a hybrid automatic repeat request (HARQ) message using the PUCCH resources.

14. The method of claim 13, further comprising:
configuring, by the BS, the DCI for inclusion in the PDCCH according to DCI format 1_0.

15. The method of claim 14, wherein the configuring further comprises:
splitting, by the BS, the resource indicator into a first part and a second part;
adding, by the BS, the first part in a first field of the DCI; and
adding, by the BS, the second part in a second field of the DCI following the first field.

16. The method of claim 13, wherein the RACH response message comprises a multicast message.

17. The method of claim 13, wherein the RACH response message comprises a unicast message.

18. The method of claim 13, wherein a look-up table associated with the resource indicator comprises a first number of entries in response to the resource indicator comprising a length of four bits, and a second number of entries in response to the resource indicator comprising a length of three bits, the second number of entries comprising a subset of the first number of entries.

19. The method of claim 13, further comprising:
including, by the BS, a timing advance for the UE in a physical downlink shared channel (PDSCH) of the RACH response message; and
transmitting, by the BS to the UE, the PDSCH as another part of the RACH response message.

20. The method of claim 13, further comprising:
scrambling, by the BS prior to the transmitting and as part of the RACH response message, a cyclic redundancy check (CRC) of a physical downlink control channel (PDCCH) with a message B radio network temporary identifier (RNTI).

21. A user equipment, comprising:
a transceiver configured to receive, from a base station (BS), a random access channel (RACH) response message as part of a two-step RACH procedure; and
a processor configured to:
decode, in response to a radio resource control (RRC) connection state corresponding to a connected state, a physical downlink control channel (PDCCH) of the RACH response message to obtain a resource indicator based on a downlink control information (DCI) of the PDCCH;
decode, in response to the RRC connection state corresponding to a non-connected state, a physical downlink shared channel (PDSCH) of the RACH response message to obtain the resource indicator of the PDSCH; and
determine physical uplink control channel (PUCCH) resources to use for a hybrid automatic repeat request (HARQ) procedure based on the resource indicator,
wherein the transceiver is further configured to transmit, to the BS, a HARQ message using the PUCCH resources.

22. The user equipment of claim 21, wherein the DCI comprises DCI format 1_0.

23. The user equipment of claim 21, wherein the processor is further configured to:
access the resource indicator in a PUCCH resource indicator field of the DCI.

24. The user equipment of claim 23, wherein the resource indicator comprises a length of four bits.

25. The user equipment of claim 21, wherein the processor is further configured to:
access a first part of the resource indicator in a first field of the DCI;
access a second part of the resource indicator in a second field of the DCI following the first field with another field in between the first and second fields; and
combine the first part and the second part to form the resource indicator.

26. The user equipment of claim 21, wherein the processor is further configured to:
decode, prior to the transmission, a physical downlink shared channel (PDSCH) of the RACH response message; and
determine a timing advance from the PDSCH of the RACH response message for the HARQ procedure.

27. The user equipment of claim 21, wherein the PUCCH resources determined from the PDSCH include dynamically selected configuration parameters.

28. The user equipment of claim 21, wherein the RACH message comprises a multicast message.

29. The user equipment of claim 21, wherein the RACH message comprises a unicast message.

30. The user equipment of claim 21, wherein the processor is further configured to access a look-up table based on the resource indicator.

31. The user equipment of claim 30, wherein the look-up table comprises a first number of entries in response to the resource indicator comprising four bits, and a second number of entries in response to the resource indicator comprising three bits, the second number of entries comprising a subset of the first number of entries.

32. The user equipment of claim 21, wherein the processor is further configured, as part of the decode in response to the RRC connection state corresponding to a non-connected state, to:
apply a message B radio network temporary identifier (RNTI) to descramble and decode the PDSCH.

33. A base station, comprising:
a transceiver configured to receive, from a user equipment (UE), a random access channel (RACH) message as part of a two-step RACH procedure; and
a processor configured to:
include a resource indicator in downlink control information (DCI) in a physical downlink control channel (PDCCH) for use by the UE with a radio resource control (RRC) connection state corresponding to a connected state; and
include the resource indicator in a physical downlink shared channel (PDSCH) for use by the UE with a RRC connection state corresponding to an unconnected state, the resource indicator related to physical uplink control channel (PUCCH) resources;
wherein the transceiver is further configured to:
transmit, to the UE, the PDCCH and the PDSCH as part of a RACH response message; and
receive, from the UE, a hybrid automatic repeat request (HARQ) message using the PUCCH resources.

34. The base station of claim 33, wherein the processor is further configured to:
configure the DCI for inclusion in the PDCCH according to DCI format 1_0.

35. The base station of claim 34, wherein the processor is further configured to:
split the resource indicator into a first part and a second part;
add the first part in a first field of the DCI; and
add the second part in a second field of the DCI following the first field.

36. The base station of claim 33, wherein the RACH response message comprises a multicast message.

37. The base station of claim 33, wherein the RACH response message comprises a unicast message.

38. The base station of claim 33, wherein a look-up table associated with the resource indicator comprises a first number of entries in response to the resource indicator comprising four bits, and a second number of entries in response to the resource indicator comprising three bits, the second number of entries comprising a subset of the first number of entries.

39. The base station of claim 33, wherein:
the processor is further configured to include a timing advance for the UE in a physical downlink shared channel (PDSCH) of the RACH response message; and
the transceiver is further configured to transmit, to the UE, the PDSCH as another part of the RACH response message.

40. The base station of claim 33, wherein the processor is further configured to:
scramble, as part of the RACH response message, a cyclic redundancy check (CRC) of a physical downlink control channel (PDCCH) with a message B radio network temporary identifier (RNTI).

* * * * *